US012705320B2

(12) United States Patent
MacGregor et al.

(10) Patent No.: US 12,705,320 B2
(45) Date of Patent: Aug. 11, 2026

(54) SECURE SOFTWARE COMMUNICATION WITH AUTONOMOUS VEHICLES

(71) Applicant: Zoox, Inc., Foster City, CA (US)

(72) Inventors: Collin MacGregor, Redwood City, CA (US); Ravi Gogna, San Jose, CA (US)

(73) Assignee: Zoox, Inc., Foster City, CA (US)

( * ) Notice: Subject to any disclaimer, the term of this patent is extended or adjusted under 35 U.S.C. 154(b) by 865 days.

(21) Appl. No.: 17/979,658

(22) Filed: Nov. 2, 2022

(65) Prior Publication Data

US 2024/0143705 A1 May 2, 2024

(51) Int. Cl.
*G06F 21/30* (2013.01)
*G05D 1/227* (2024.01)

(52) U.S. Cl.
CPC ......... *G06F 21/305* (2013.01); *G05D 1/2272* (2024.01)

(58) Field of Classification Search
CPC ............................ G06F 21/305; G05D 1/2272
See application file for complete search history.

(56) References Cited

U.S. PATENT DOCUMENTS 9,342,074 B2 * 5/2016 Dolgov ................. B60W 50/14
10,343,698 B2 * 7/2019 Poeppel .......... B60W 60/00253
10,969,782 B2 * 4/2021 Nix ....................... H04W 12/64
11,364,925 B2 * 6/2022 Schoenfeld ....... B60W 50/0225
11,729,270 B2 * 8/2023 Way ........................ H04L 67/12 701/2
11,840,266 B2 * 12/2023 Woodrow ........... B60W 60/007
11,841,705 B2 * 12/2023 Goldman .............. H04L 67/125
11,993,285 B2 * 5/2024 Sorensen ......... G06Q 10/06316
12,050,463 B2 * 7/2024 Yamazato ............ G05D 1/0061
2019/0066402 A1 2/2019 Unagami
2020/0004268 A1 1/2020 Park
2020/0062267 A1 * 2/2020 Magzimof .......... B60W 50/082
2021/0024079 A1 * 1/2021 Jiao ........................ G06Q 20/10
2021/0144152 A1 5/2021 Gogna et al.
2021/0288816 A1 9/2021 Sorensen
2021/0302958 A1 9/2021 Tschanz et al.
2022/0027820 A1 * 1/2022 Chalam .................. G06Q 10/02
2022/0043459 A1 * 2/2022 Ayers ...................... H04L 67/12
2022/0137615 A1 * 5/2022 Eperjesi ............... G05D 1/0027 701/2
2022/0371574 A1 * 11/2022 Chevalier ......... B60W 60/0023
(Continued)

OTHER PUBLICATIONS

Office Action for U.S. Appl. No. 17/979,665, dated Oct. 22, 2024, 18 pages.

(Continued)

*Primary Examiner* — Viral S Lakhia
(74) *Attorney, Agent, or Firm* — Lee & Hayes, P.C.

(57) ABSTRACT

Techniques for engaging and disengaging a vehicle from an autonomous operation mode are described. The techniques include receiving a request to engage or disengage the autonomous mode at a teleoperations system. The request is validated at the teleoperations system using a first set of conditions describing trust in the request and validity of the request. The request is then sent, if valid, to the vehicle where a second validation is performed using a second set of conditions describing the conditions or states of the vehicle. If the second conditions are valid then the request is performed and the vehicle engages or disengages from autonomous mode.

20 Claims, 7 Drawing Sheets

(56) References Cited

U.S. PATENT DOCUMENTS

| | | | | |
|---|---|---|---|---|
| 2024/0101159 | A1 | 3/2024 | Yeom et al. | |
| 2024/0340158 | A1* | 10/2024 | Choi | H04L 9/06 |

OTHER PUBLICATIONS

Non-Final Office Action for related U.S. Appl. No. 17/979,665, dated Jun. 30, 2025, 18 Pages.
Office Action for related U.S. Appl. No. 17/979,665, dated Mar. 31, 2025, 18 Pages.
PCT Search Report and Written Opinion mailed on Feb. 15, 2024 for PCT Application No. PCT/US2023/036011 from PCT Summary, 11 pages.
Final Office Action for related U.S. Appl. No. 17/979,665, dated Dec. 29, 2025, 21 pages.

* cited by examiner

SECURE SOFTWARE COMMUNICATION WITH AUTONOMOUS VEHICLES

BACKGROUND

Vehicles operate in dynamic environments in which conditions are often changing. Among the changing conditions are moving objects (e.g., pedestrians, other vehicles, etc.), road blockages due to construction, accidents, and the like. Vehicles may be programmed to react to the changing conditions, while maintaining the vehicle within a designated operations protocol. Additionally, vehicles may be configured to receive and react to control signals from remote operators, such as those configured to provide assistance to the vehicle in the changing conditions. For example, a vehicle may receive, from a remote computing device, an instruction to stop movement of the vehicle operating in an environment based on detecting a hazardous object. However, in certain situations, the instruction may cause the vehicle to be stopped in an undesirable area (e.g., a no-stopping area), such as in an intersection, which can be potentially dangerous for the vehicle and disruptive to other vehicles in the environment.

BRIEF DESCRIPTION OF THE DRAWINGS

The detailed description is described with reference to the accompanying figures. The use of the same reference numbers in different figures indicates similar or identical components or features.

DETAILED DESCRIPTION

Figure 1:
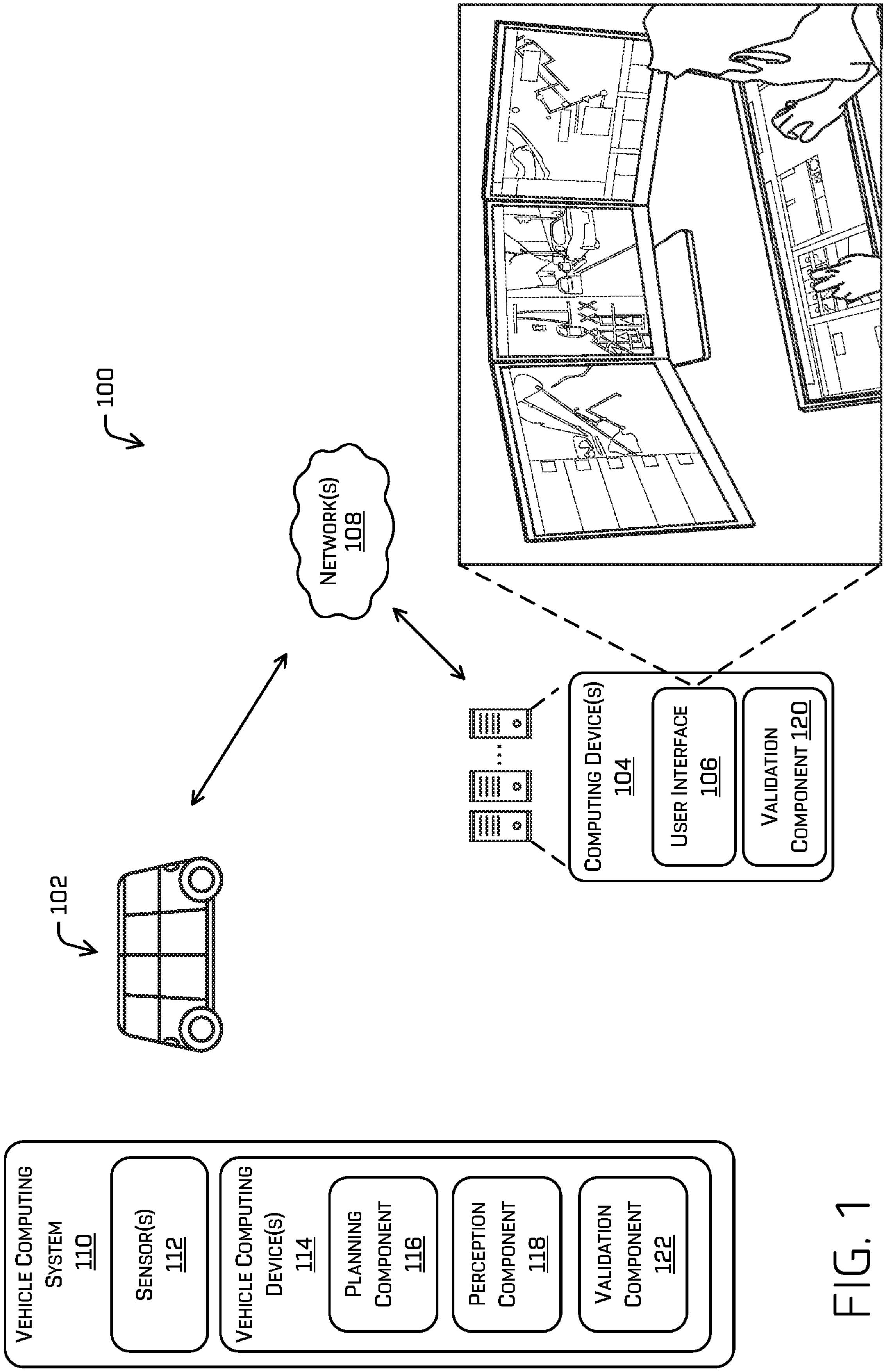
FIG. 1 illustrates a schematic diagram of an example environment with an example vehicle in communication with a remote operator, according to at least one example.

Techniques described herein are directed to directing control of a computing device from a remote computing device in a secure manner to prevent potential intrusion or inadvertent interruption of the operation of the computing device. The examples herein may be described with respect to a vehicle, such as an autonomous vehicle, in communication with a remote computing device, such as a teleoperator device, and instructing the vehicle to enter and/or exit an autonomous driving mode. Though the examples may be described with respect to such environments, the systems and techniques described herein may be applicable to any secure communication system between computing devices to enable control of a first computing device, for one or more actions, by a second computing device. Accordingly, the techniques described herein include verifying the source of the request, the type of request, and the status of the first computing device to be instructed before any instruction is sent. In this manner, the first computing device (the device to be instructed) may have confidence in the source of the request and the system may increase confidence in performance of the remote-control operation, that such remote-control operations are only performable based on specific predefined criteria being met (e.g., when it is safe to implement such operations).

In an example, an autonomous vehicle may operate within an environment, for example to provide delivery routes for persons or objects between pickup and drop off locations. The autonomous vehicle may or may not include a driver interface such as a steering wheel or other such device that allows a passenger within the vehicle to control the vehicle. Such a device may be used, for example, to maneuver the vehicle when inoperable and/or to perform specified tests by an operator, or otherwise. In some examples, the vehicle may only be controlled through the use of a computing device, either tethered to the vehicle or remote from the vehicle, without input from an MDI and/or without any MDI at all. In such examples, the vehicle may encounter scenarios where the vehicle would need to engage an autonomous driving mode and/or exit an autonomous driving mode, but needs to verify that the system and environment are appropriate for such action before proceeding, and thereby preventing exiting an autonomous driving mode while a vehicle is in motion or in the midst of a mission, which may impact performance of the vehicle.

The autonomous vehicle may need to enter and exit autonomous driving modes to begin and end operating sessions, such as when the vehicle is available to pick up and engage with missions. The autonomous vehicle may have an autonomous driving mode wherein the autonomous vehicle navigates through an environment without driving input from a user and/or passenger. The autonomous vehicle may have a manual driving mode where local or remotely provided commands are used to direct the vehicle in an environment. The autonomous vehicle may also have a semi-autonomous driving mode where a passenger, user, or remote operator may provide inputs as suggestions or performs some portion of driving tasks while leaving other tasks up to the autonomous vehicle. In an illustrative example, in a semi-autonomous mode the vehicle may keep pace with traffic and/or change lanes while navigating turns, such as to turn at an intersection, are based on driver inputs. The different modes for the autonomous vehicle may enable or allow for local and/or remote commands to interact with the vehicle. In the manual driving mode, the local or remote commands may be used to cause the autonomous vehicle to move, and the vehicle may only move and navigate based on the commands. A remote operator may be able to position the vehicle in an appropriate zone, such as a staging area, before entering or exiting the autonomous driving mode, and thereby ensure that the vehicle is ready for such a request. In some examples, during operations, the vehicle may encounter scenarios where autonomous mode may need to disengage in a safe manner for passengers within the vehicle and surrounding vehicles and objects. For example, in the event of a fault on the vehicle, such as a flat tire, road hazard, or emergency services vehicle, the vehicle may need to exit autonomous mode to resolve the situation before proceeding with the mission.

The techniques (e.g., systems, methods, software, etc.) provided herein enables the vehicle to receive a request to enter and/or exit an autonomous mode based on a request from a teleoperator. The teleoperator request passes through one or more levels of verification and validation to ensure that the request is originating from an appropriate source (e.g., an authentic teleoperator and not a malicious incursion by a separate actor), includes a valid request and/or a valid operation for the vehicle to perform an action, ensures that the vehicle is in an appropriate location, that the vehicle to be guided is the correct vehicle (the vehicle the remote operator intends to guide), that the vehicle is in an appropriate state and/or mode before performing the action requested by the teleoperator. In the event that the request fails to satisfy one or more of the verifications, the request may be rejected at various points within the system, further ensuring security of the vehicle system and preventing requests that are invalid for one or more reasons from reaching the vehicle and/or being performed by the vehicle.

In a first example, a vehicle may include a vehicle computing system controlling one or more operations, such as operations in an autonomous driving mode including planning a route, receiving sensor data, identifying surrounding objects, navigating based on sensor data, and operating various vehicle functions. The vehicle computing system may be on-board the vehicle and in communication with a remote computing device, such as a teleoperations computing system. The communication may occur over a network that may include one or more network devices and/or communication systems including the internet, one or more cellular or other wireless networks, or other communication channels. The vehicle may initially be in a manual or standby driving mode before beginning operation and may need to transition to autonomous mode to begin receiving mission data for pickup and drop offs associated with objects and/or persons to transport. In some examples, the vehicle may have different modes associated with different driving modes or states for the vehicle to exist in. For instance, the vehicle may be in a manual driving mode where a local or remote operator may cause the vehicle to take actions through operator inputs, a standby mode where the vehicle may be prepared to begin a mission or is awaiting instructions to begin a mission, an autonomous mode where the vehicle navigates an environment based on its own sensor inputs, a low power mode where one or more operations of the vehicle may be reduced, a service mode where the vehicle may be controlled within a service depot by a service operator, or other such modes or states where one or more systems of the vehicle may operate differently based on the different mode.

In the first example, the vehicle is not in autonomous mode (e.g., is either stopped, controlled by an operator either local or remote to the vehicle, etc.) and is not on a current mission (e.g., picking up, dropping off, transporting, mapping, etc.), but may be caused to enter autonomous mode and begin accepting mission data based on a request from the teleoperations system. In such examples, the vehicle is stationary but may be running and/or prepared to begin movement in an environment. The teleoperator, via the teleoperations system may submit a request to engage autonomous mode on the vehicle. The request may be sent as part of a request to begin a mission (e.g., to head to a pickup location) or may be part of a request to engage autonomous mode and await a mission.

The request may be validated, by the teleoperation computing system and/or by a validation component associated therewith. The validation component may, for example, be hosted on or associated with a network device connected with the fleet and/or the vehicle. The validation may be a first validation that confirms the request (e.g., acknowledges the request and/or sends a message back indicating that a request has been received), confirms a format of the request (e.g., that the request conforms to a particular data layout and/or has all required information, which may comprise a cryptographically secure key), confirms request information such as mission information, confirms the source of the request (e.g., confirms the identity of the teleoperations system using a key, hash, cryptographic marker, or other identifiers), and confirms the request is valid to be sent to the vehicle. The first validation may include validation of the request and of the identity of the device sending the request, for example, the first validation may include verification of permissions and/or keys and may also verify that the type of request is a valid request. For instance, the first validation may determine, using a machine learning model, if the instruction provided with the request is suitable for the vehicle to perform (e.g., possible and safe), if the instruction fits within a context (directing to pull over in a location that is suitable for a pull-over), and/or if the instruction is to comply with one or more other circumstances, such as a presence of an emergency vehicle. In some examples, the validation may include a validation score that is determined by the validation component based on one or more factors. For example, the validation score may be based on the source of the request, a trust score associated with the source (e.g., is the source of the request known and identified using a history of requests and/or one or more secure keys), the type of request (e.g., is the request to enter autonomous mode, begin a mission, navigate to a particular location), and other such information. In some examples, the validation score may be determined using one or more algorithms and/or machine learning models trained to evaluate the factors individually and/or aggregated together to generate the validation score. The validation score may be compared against a threshold, which may be static or may vary based on the type of the request, for instance with a higher threshold required for particular actions such as navigating the vehicle to a location while a lower threshold may be used for actions such as only engaging an autonomous mode without any further action provided by the request.

The validity component and/or the teleoperations system may generate first validity data indicating whether the request is valid or invalid, or if the request is above or below the threshold discussed herein. In some examples, the first validity data may be a binary indication of validity (is the request valid or not). In some examples, the first validity data may include the validity score and/or multiple scores. In various examples, the validity score may be based at least in part on the number of conditions that are met, a weighted sum of conditions being met (e.g., where certain conditions contribute more to the score than others), or some other formulaic combination of various conditions to determine an overall validity score. The validity component and/or the teleoperations system may determine to convey the request to the vehicle based on the first validity data. The request may be conveyed in response to the first validity data indicating the request is valid and/or that the validity score meets or exceeds the threshold. The request may be rejected based on the first validity score, for example when the first validity indicates the request is invalid for one or more reasons (e.g., lack of a key, invalid format, untrustworthy source, etc.) and/or if the validity score is at or below the threshold. In some examples, the request may be rejected without further action. In some examples, the request may be rejected and returned to a user device with a notification displayed at a user interface indicating the rejection of the request and the one or more reasons for the rejection of the request. In this manner, the rejected request is not conveyed through the system to the vehicle computing system, but is rejected at the teleoperations system and/or at a network device implementing a validity component before reaching the vehicle computing system.

In the event that the request passes the first validation, the request may be conveyed through a network to the vehicle computing system for a second validation. In some examples, in response to passing the first validation, the request may be encrypted, associated with a key or a hash identifier, or otherwise modified to indicate the first validation. The vehicle computing system may receive the request and verify the identifier of the first validation, such as by identifying a key, comparing an identifier, or other such verifications. The vehicle computing system may then perform a second validation of the request. The second validation may include validation of one or more conditions, that may be the same and/or different from the conditions evaluated at the first validation. For example, the identity of the source of the request, the format of the request, the type of action required, may each be validated as described herein. In some examples, the vehicle computing system may perform the second validation by using conditions related to the state, location, and condition of the vehicle. In the example, before engaging autonomous mode (as included in the request) the vehicle computing system may confirm that the vehicle is (1) stationary, (2) free of faults that would prevent autonomous mode (e.g., no operational system faults or faults with sensor systems or computer systems), and/or (3) that the request is valid. In some examples, the vehicle computing system may send an acknowledgement to the teleoperations system indicating that the vehicle computing system determined the validity based on the conditions described above, and is performing the action or will perform the action. Additionally, in some examples, the second validation may include evaluation of the location of the vehicle, for instance whether the vehicle is located in a location suitable for engaging autonomous mode. In other examples, the second validity may be based at least in part on a feasible operation of the autonomous vehicle (or corresponding system). In some such examples, the second validity may be determined based at least in part on determining whether the action constitutes a valid operation. A valid operation may include an operation that is kinematically and/or dynamically feasible for the vehicle to perform in the given environment and operating state. The valid operation may also be based on the operation requiring controls that are within particular limits set for one or more subsystems of the vehicle including limits for steering, audio, lighting, braking, and the like. Valid operations may be operations that are not excluded by safety imitations, e.g., braking, or steering limitations, but may also be operations that are physically possible and/or legally allowed in the operating environment. For example, instructing a U-turn on a divided highway may be physically possible but is not legally allowed in the operating environment and would be rejected. For example, such invalid operations may comprise the vehicle being unable to safely perform the action (e.g., due to safety reasons including, for example, being in a certain geographic location, moving too quickly, etc., being outside of a set of parameters—e.g., too high acceleration, kinematic/dynamic constraints, etc.), the action being restricted (e.g., a subset of controls may be disabled for remote operation), a format being incorrect, or otherwise. In the event that one or more of the second conditions are not met or satisfied, the request may be rejected, and feedback may be provided to the teleoperations system describing why the request was rejected. In some examples, the vehicle computing system may verify the validity of the request and the one or more other conditions and, in response to determining that one or more of the conditions is not satisfied, may determine if the vehicle can take an action to satisfy the condition, such as moving to a predetermined location, stopping motion, resolving one or more faults, or other such actions. When the vehicle computing system determines that the second validation is confirmed or valid, then the vehicle may perform the requested action, such as to engage in autonomous mode in the present example.

In a second example, the vehicle may be in autonomous mode, either in the midst of performing a mission, or awaiting a mission (e.g., the state of the vehicle may be busy with a mission or awaiting a mission). In such examples, the vehicle may not be stationary as the mission involves movement or may be stationary if awaiting a mission. The teleoperator, via the teleoperations system may submit a request to disengage from autonomy for a variety of reasons, including for example a vehicle encountering an incident response including emergency services dealing with a situation on or adjacent to the road, including action in the environment from first responders (police, fire, ambulance, etc.). In some examples, the teleoperator may be disengaging from autonomy to direct the vehicle to a service location for resolving a service issue or otherwise to move to a different location or otherwise manually interact with the vehicle.

In the second example, the vehicle is in autonomous mode and may or may not be on a current mission, but may be caused to disengage from autonomous mode for one or more purposes. The teleoperator, via the teleoperations system may submit a request to disengage autonomous mode on the vehicle. The request may be sent as part of a request to perform one or more other actions (e.g., navigate to a service location or standby location or other action).

The request may be validated, by the teleoperation computing system and/or by a validation component associated therewith. The validation component may, for example, be hosted on or associated with a network device connected with the fleet and/or the vehicle. The validation may be a first validation that confirms the request, confirms a format of the request, confirms request information such as mission information, confirms the source of the request (e.g., confirms the identity of the teleoperations system using a key, hash, cryptographic marker, or other identifiers), and confirms the request is valid to be sent to the vehicle. In some examples, the validation may include a validation score that is determined by the validation component based on one or more factors. For example, the validation score may be based on the source of the request, a trust score associated with the source (e.g., is the source of the request known and identified using a history of requests and/or one or more secure keys), the type of request (e.g., is the request to enter autonomous mode, begin a mission, navigate to a particular location), and other such information. In some examples, the validation score may be determined using one or more algorithms and/or machine learning models trained to evaluate the factors and aggregated together to generate the validation score. The validation score may be compared against a threshold, which may vary based on the type of the request, for instance with a higher threshold required for particular actions such as navigating the vehicle to a location while a lower threshold may be used for actions such as only disengaging an autonomous mode without any further action provided by the request. In some examples, the threshold may be based on the status of the vehicle, with a higher threshold for vehicles currently on mission and a lower threshold for vehicles not currently engaged in a mission.

The validity component and/or the teleoperations system may generate first validity data indicating whether the request is valid or invalid, or if the request is above or below the threshold discussed herein. In some examples, the first validity data may be a binary indication of validity. In some examples, the first validity data may include the validity score and/or multiple scores. The validity component and/or the teleoperations system may determine to convey the request to the vehicle based on the first validity data. The request may be conveyed in response to the first validity data indicating the request is valid and/or that the validity score meets or exceeds the threshold. The request may be rejected based on the first validity score, for example when the first validity indicates the request is invalid for one or more reasons (e.g., lack of a key, invalid format, untrustworthy source, etc.) and/or if the validity score is below the threshold. In some examples, the request may be rejected without further action. In some examples, the request may be rejected and returned to a user device with a notification displayed at a user interface indicating the rejection of the request and the one or more reasons for the rejection of the request. In this manner, the rejected request is not conveyed through the system to the vehicle computing system, but is rejected at the teleoperations system and/or at a network device implementing a validity component before reaching the vehicle computing system.

In the event that the request passes the first validation, the request may be conveyed through a network to the vehicle computing system for a second validation. In some examples, in response to passing the first validation, the request may be encrypted, associated with a key or a hash identifier, or otherwise modified to indicate the first validation. The vehicle computing system may receive the request and verify the identifier of the first validation, such as by identifying a key, comparing an identifier, or other such verifications. The vehicle computing system may then perform a second validation of the request. The second validation may include validation of one or more conditions, that may be the same and/or different from the conditions evaluated at the first validation. For example, the identity of the source of the request, the format of the request, the type of action required, may each be validated as described herein. In some examples, the vehicle computing system may perform the second validation by using conditions related to the state, location, and condition of the vehicle. In the example, before disengaging autonomous mode (as included in the request) the vehicle computing system may confirm that the vehicle is stationary and in a designated location such as a parking area, standby location, or otherwise out of a traffic region. In the event that one or more of the second conditions are not met or satisfied, the request may be rejected, and feedback may be provided to the teleoperations system describing why the request was rejected. In some examples, the vehicle computing system may verify the validity of the request and the one or more other conditions and, in response to determining that one or more of the conditions is not satisfied, may determine if the vehicle can take an action to satisfy the condition, such as moving to a designated location, such as to park and stopping motion. When the vehicle computing system determines that the second validation is confirmed or valid, then the vehicle may perform the requested action, such as to disengage from autonomous mode in the present example. In some examples, after the vehicle navigates to the designated location, the vehicle computing system may either disengage autonomous mode and/or may send a signal to the teleoperations system indicating disengagement is available as an option and may disengage autonomous mode in response to a second request from the teleoperations system after the second validity is performed and validated.

The systems and techniques described herein provide for systems to improve secure communication between computing devices, and in particular, to provide additional layers of security and protection to communications requesting a remote computing device perform a particular action. In the context of a vehicle system, the techniques described herein enable a teleoperator to engage and disengage a vehicle from autonomous mode without being able to disengage the vehicle in a potentially dangerous situation or preventing engaging autonomous mode from being engaged remotely unless the system is prepared for such engagement. As such, they may enhance and ensure the safe operation of the autonomous vehicle (or other system). Further, the techniques and systems described herein enable secure validation of teleoperation requests that are verified at different levels using different techniques and/or conditions to ensure validity of a teleoperation request and thereby increasing security of a teleoperations system.

FIG. 1 illustrates a schematic diagram of an environment 100 with an example vehicle in communication with a remote operator, according to at least one example.

In various examples, a vehicle computing system 110 may be configured to autonomously control the vehicle 102 through the environment 100. In at least one example, the vehicle computing system 110 may be configured to request assistance and/or validation of operations from a remote operator and/or may receive requests to enter or exit an autonomous driving mode from the remote operator. In such an example, the vehicle computing system 110 may establish a connection with one or more computing device 104 associated with the remote operator. In some examples, the remote operator associated with the computing device 104 may receive sensor data associated with the environment 100 (e.g., sensor data indicating an object in the environment 100) and based on the object, may send an instruction to cause the vehicle 102 to perform an action, such as to navigate to a particular location, enter an autonomous driving mode, exit an autonomous driving mode, or other such actions.

In some examples, sensor data may be received from one or more sensor(s) 112 mounted on the vehicle 102, and include, without limitation, ultrasonic sensors, radar sensors, light detection and ranging (lidar) sensors, cameras, microphones, inertial sensors (e.g., inertial measurement units, accelerometers, gyros, etc.), global positioning satellite (GPS) sensors, and the like. For example, the vehicle computing system 110 may receive sensor data of the environment 100 from one or more dashcams mounted on the vehicle 102, and the sensor data may indicate an object, such as a vehicle with a protruding object, a traffic cone, a hazard road sign, fencing, a double-parked vehicle, and/or the like. The vehicle computing system 110 may send the sensor data to the computing device 104, and the computing device 104 may generate the instruction to stop movement of the vehicle 102 based at least in part on the sensor data and may also cause the vehicle 102 to exit an autonomous driving mode and enter a manual control mode for navigating the environment 100.

In some examples, the sensor data may be received from one or more remote sensors, such as, for example, sensors mounted on one or more other vehicles and/or sensors mounted in the environment 100. For example, one or more remote sensors may be mounted in the environment 100 to provide additional visibility in an area of reduced visibility, such as, for example, in a blind or semi-blind intersection. In an example, the computing device 104 may receive sensor data of the environment 100 from one or more traffic monitoring cameras mounted at an intersection, and the sensor data may indicate a hazardous object.

In various examples, the vehicle computing system 110 may communicate with the send the message with the request to the computing device 104 via a network 108. In at least one example, the computing device 104 may include a user interface 106 via which a request or message may be entered and/or viewed. That is, the vehicle computing system 110 may cause the computing device 104 to present a message via the user interface 106, for example including an error message indicating a rejection of a request. The computing device 104 may send request information and validity data over the network 108 to the vehicle 102.

The vehicle 102 may include a vehicle computing device 114 that includes a planning component 116 and a perception component 118. In at least one example, the perception component 118 can perform object detection, segmentation, and/or classification based at least in part on sensor data received from the sensor(s) 112. In at least one example, the perception component 118 can receive raw sensor data (e.g., from the sensor(s) 112). In other examples, the perception component 118 can receive processed sensor data (e.g., from the sensor(s) 112). For instance, in at least one example, the perception component 118 can receive data from a vision system that receives and processes camera data (e.g., images). In at least one example, the vision system can utilize one or more image processing algorithms to perform object detection, segmentation, and/or classification with respect to object(s) identified in an image. In some examples, the vision system can associate a bounding box (or other semantic information, such as an instance segmentation) with an identified object and can associate a confidence score associated with a classification of the identified object. In some examples, objects, when rendered via a display, can be colored based on their perceived class. In at least other examples, similar processes (detection, classification, segmentation, etc.) may be performed by the perception component 118 for one or more other modalities (e.g., lidar, RADAR, ToF sensors, etc.). The perception component 118 may further be configured to determine a location and/or a motion status of the vehicle 102, to include the physical location of the vehicle as well as vehicle velocity, acceleration, speed, or other such data that may be used to determine when the vehicle is stationary or moving and/or in a suitable location for engaging or disengaging autonomous mode, as described herein.

In at least one example, the planning component 116 can determine routes and/or trajectories to use to control the vehicle 102 based at least in part on sensor data received from the sensor(s) 112 and/or any determinations made by the perception component 118. Additional details of a perception system and/or planning system that are usable can be found in U.S. Pat. No. 9,612,123, issued on Apr. 4, 2017, and U.S. patent application Ser. No. 15/632,208, filed Jun. 23, 2017, the entire contents of both of which are incorporated by reference herein. In some examples (e.g., where the vehicle 102 is not an autonomous vehicle), one or more of the aforementioned systems and/or components can be omitted from the vehicle 102. While the systems described above are illustrated as "onboard" the vehicle 102, in other implementations, the systems can be remotely located and/or accessible to the vehicle 102.

In some examples, the computing device 104 may receive a request for teleoperations control, for example to engage or disengage a vehicle from autonomous mode and/or to provide instruction to a vehicle 102. The request may initiate from a teleoperator in response to the autonomous vehicle observing or encountering a situation such as a law enforcement interaction. In an example, in response to encountering an emergency services vehicle or personnel, the autonomous vehicle may convey information to the teleoperator indicating the presence and querying the teleoperator whether a request to disengage from an autonomous mode may be appropriate. In an example, the computing device 104 may receive, from the autonomous vehicle, information related to the environment, such as the presence of emergency services personnel or vehicles. The computing device 104 may present an option for a teleoperator to request to disengage from autonomous mode in response to the presence of emergency services. The teleoperator may select the option and generate the request to disengage from autonomous mode. In some examples, the computing device 104 may receive the request based on a teleoperator or other operator inputting a request for an autonomous vehicle to enter and/or exit an autonomous mode in response to entering or exiting a service depot. The computing device 104 may include a user interface 106 through which the request is received. The computing device 104 may further implement a validity component 120 to ensure validity of a request received through the user interface 106.

The request received through the user interface 106 may be validated, by the computing device 104 and/or by a validation component associated therewith, including a validation component connected to the network 108. The validation component may, for example, be hosted on or associated with a network device connected with the fleet and/or the vehicle. The validation may be a first validation that confirms the request received through the user interface 106, confirms a format of the request, confirms request information such as mission information, confirms the source of the request (e.g., confirms the identity of the teleoperations system using a key, hash, cryptographic marker, or other identifiers), and confirms the request is valid to be sent to the vehicle. In some examples, the validation may include a validation score that is determined by the validation component based on one or more factors. For example, the validation score may be based on the source of the request, a trust score associated with the source (e.g., is the source of the request known and identified using a history of requests and/or one or more secure keys), the type of request (e.g., is the request to enter autonomous mode, begin a mission, navigate to a particular location), and other such information. In some examples, the validation score may be determined using one or more algorithms and/or machine learning models trained to evaluate the factors and aggregated together to generate the validation score. The validation score may be compared against a threshold, which may vary based on the type of the request, for instance with a higher threshold required for particular actions such as navigating the vehicle to a location while a lower threshold may be used for actions such as only engaging an autonomous mode without any further action provided by the request.

The validity component 120 and/or the computing device 104 may generate first validity data indicating whether the request is valid or invalid, or if the request is above or below the threshold discussed herein. In some examples, the first validity data may be a binary indication of validity. In some examples, the first validity data may include the validity score and/or multiple scores. The validity component 120 and/or the computing device 104 system may determine to convey the request to the vehicle 102 based on the first validity data. The request may be conveyed in response to the first validity data indicating the request is valid and/or that the validity score meets or exceeds the threshold. The request may be rejected based on the first validity score, for example when the first validity indicates the request is invalid for one or more reasons (e.g., lack of a key, invalid format, untrustworthy source, etc.) and/or if the validity score is below the threshold. In some examples, the request may be rejected without further action. In some examples, the request may be rejected and returned to a user device with a notification displayed at the user interface 106 indicating the rejection of the request and/or the one or more reasons for the rejection of the request. In this manner, the rejected request is not conveyed through the system to the vehicle computing system, but is rejected at the computing device 104 and/or at a network device implementing a validity component 120 before reaching the vehicle computing system.

In the event that the request passes the first validation, the request may be conveyed through the network 108 to the vehicle computing system 110 for a second validation. In some examples, in response to passing the first validation, the request may be encrypted, associated with a key or a hash identifier, or otherwise modified to indicate the first validation. The vehicle computing system 110 may receive the request and verify, using a validation component 122, the identifier of the first validation, such as by identifying a key, comparing an identifier, or other such verifications. The vehicle computing system 110 may then perform a second validation of the request using the validation component 122. The second validation may include validation of one or more conditions, that may be the same and/or different from the conditions evaluated at the first validation. For example, the identity of the source of the request, the format of the request, the type of action required, may each be validated as described herein. In some examples, the vehicle computing system 110 may perform the second validation by using conditions related to the state, location, and condition of the vehicle 102. In an example, before engaging autonomous mode (as included in the request) the vehicle computing system 110 may confirm that the vehicle is (1) stationary, (2) free of faults that would prevent autonomous mode (e.g., no operational system faults or faults with sensor systems or computer systems), and/or (3) that the request is valid. In some examples, the vehicle 102 may not be required to be stationary, but the vehicle computing system 110 may confirm one or more additional settings or conditions, such as whether a planner system is active and operational (e.g., booted up and not in error mode), that one or more sensors of the autonomous vehicle are operational and not in error state, that the vehicle is within a geofenced location, such as an approved autonomous mode waiting area, that operating hours for a particular vehicle are met (e.g., that a vehicle scheduled to operate overnight but not during the day may only enter autonomous mode when the current time is within a time window), weather conditions around the vehicle and/or in a zone of operation for the vehicle, free of faults or errors, presence of a valid and/or stable connection to a teleoperations center, that the vehicle is able to maneuver in a safe manner in the surrounding environment and based on vehicle conditions, and/or other checks required by autonomous mode of the vehicle. In some examples, the second validation may include evaluation of the location of the vehicle 102, for instance whether the vehicle 102 is located in a location suitable for engaging autonomous mode. In the event that one or more of the second conditions are not met or satisfied, the request may be rejected, and feedback may be provided to the teleoperations system describing why the request was rejected. In some examples, the vehicle computing system 110 may verify the validity of the request and the one or more other conditions and, in response to determining that one or more of the conditions is not satisfied, may determine if the vehicle can take an action to satisfy the condition, such as moving to a predetermined location, stopping motion, resolving one or more faults, or other such actions. When the vehicle computing system determines that the second validation is confirmed or valid, then the vehicle may perform the requested action, such as to engage in autonomous mode in the present example.

In some examples, in response to determining that the request is invalid, at either the validation component 120 and/or the validation component 122, the computing device 104 may generate a message to send to the remote operator (e.g., the computing device 104. In some examples, the message may indicate that the request is invalid for one or more reasons and that the vehicle 102 is going to continue in its current mode and/or state.

Figure 2:
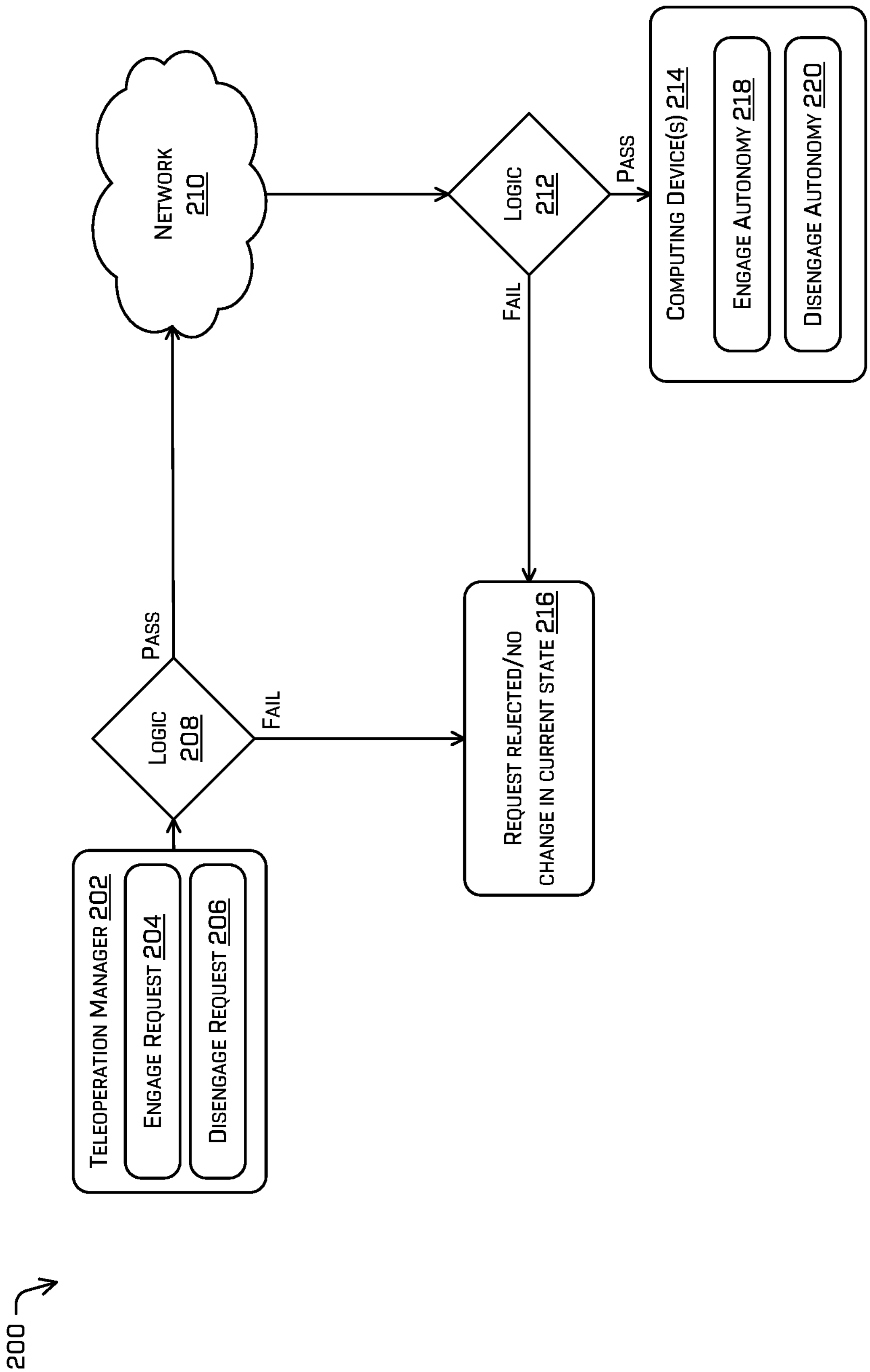
FIG. 2 illustrates a flow diagram illustrating an example process for enabling secure communications between computing devices to enable control of a second computing device by a first computing device, according to at least one example.

FIG. 2 illustrates a block diagram depicting a system 200 for enabling secure communications between computing devices to enable control of a second computing device by a first computing device, according to at least one example. In the system 200 a teleoperation manager 202 (e.g., a first computing device) may be in communication with a computing device 214 (e.g., a vehicle computing device or other computing device that may be partially or wholly controlled by the teleoperation manager 202.

Though some examples herein may be described with respect to a vehicle, such as an autonomous vehicle, in communication with a remote computing device, such as a teleoperator device and instructing the vehicle to enter and/or exit an autonomous driving mode, other systems and operations are envisioned that may implement the techniques described herein. The systems and techniques described herein may be applicable to any secure communication system between computing devices to enable control of a computing device, for at least one or more actions, by a second computing device. Accordingly, the techniques described herein provide to verifying the source of the request, the type of request, and the status of the computing device being instructed before causing any action to be performed by the computing device. In this manner, the computing device may have confidence in the source of the request and the system may increase confidence in performance of the remote-control operation, that such remote-control operations are only performable based on specific predefined criteria.

The teleoperation manager 202 may be used to send an engage request 204 and/or a disengage request 206 to the computing device 214, which may be a single computing device of a network, fleet, or collection of possible computing devices in some environments. The engage request 204 may be a request for a vehicle to engage with a particular mode, such as to enter an autonomous mode. The engage request 204 may also be used to engage a particular type of operation or mode, such as enabling a vehicle to be reserved, or other such requests. The disengage request 206 may include a request to disengage from an autonomous mode or any other mode associated with the computing device 214.

Upon receiving input at the teleoperation manager 202, e.g., from a user, the teleoperation manager passes either the engage request 204 or the disengage request 206 through logic 208. The logic 208 may be implemented at the teleoperation manager 202 and/or at a network device that manages requests from one or more teleoperation managers, such as a gateway or other network device that provides access to the network 210 from the teleoperation manager 202.

The logic 208 may evaluate the request and determine if the request passes or fails, which determines whether the request is passed through the network 210 to the computing device 214. Should the request fail at logic 208, then the request is rejected with no change in the current state of the computing device 214, as shown at 216.

The logic 208 may perform a validity determination on the request. The validity determination at logic 208 is a first validation that confirms the request (either the engage request 204 or the disengage request 206) received from the teleoperation manager 202 is valid. The request may be valid if the logic 208 determines that the request satisfies one or more conditions, such as to confirm a format of the request, confirm request information such as mission information or state information, confirm the source of the request (e.g., confirm the identity of the teleoperation manager 202 using a key, hash, cryptographic marker, or other identifiers), and confirm the request is valid to be sent to the computing device 214.

In some examples, the logic 208 may include a determination of a validation score based on one or more factors. For example, the validation score may be based on the source of the request, a trust score associated with the source (e.g., is the source of the request known and identified using a history of requests and/or one or more secure keys), the type of request (e.g., is the request to enter autonomous mode, begin a mission, navigate to a particular location), and other such information. In some examples, the validation score may be determined using one or more algorithms and/or machine learning models trained to evaluate the factors and aggregated together to generate the validation score. The validation score may be compared against a threshold, which may vary based on the type of the request, for instance with a higher threshold required for particular actions such as navigating the vehicle to a location while a lower threshold may be used for actions such as only engaging an autonomous mode without any further action provided by the request.

The logic 208 may also generate first validity data indicating whether the request is valid or invalid, or if the request is above or below the threshold discussed herein. In some examples, the first validity data may be a binary indication of validity. In some examples, the first validity data may include the validity score and/or multiple scores. The logic 208 may only pass the request on if the validity score passes. In such examples, the first validity data may be appended to the request and may be conveyed through the network 210.

At logic 212, which may be implemented at a gateway device, at the computing device 214, or some other device in-between the teleoperation manager 202 and the computing device 214, determines second validity information for the request that may result in the request being rejected or passed to the computing device 214.

In some examples, in response to passing the first validation at logic 208, the request may be encrypted, associated with a key or a hash identifier, or otherwise modified to indicate the first validation. The request may be received at logic 212, and verify the identifier of the first validation, such as by identifying a key, comparing an identifier, or other such verifications. The logic 212 may then perform a second validation of the request. The second validation may include validation of one or more conditions or states of the computing device 214, such as whether the computing device 214 is in a mode or state to accept and act on the request and may include conditions, that may be the same and/or different from the conditions evaluated at the first validation. For example, the identity of the source of the request, the format of the request, the type of action required, may each be validated as described herein. In some examples, the logic 212 may include conditions related to the state, location, and condition of the vehicle. In the example, before engaging autonomous mode (as included in the request) the vehicle computing system may confirm that the vehicle is (1) stationary, (2) free of faults that would prevent autonomous mode (e.g., no operational system faults or faults with sensor systems or computer systems), and/or (3) that the request is valid. As described above, additional conditions may be evaluated, and one or more of the above conditions may not be required. For instance, the vehicle may receive the request to disengage while in motion and may, as part of the disengagement process, navigate to a parking or pull-over location where autonomous mode is ultimately disengaged. Additionally, in some examples, the second validation may include evaluation of the location of the vehicle, for instance whether the vehicle is located in a location suitable for engaging autonomous mode.

In the event that one or more of the second conditions are not met or satisfied at logic 212, the request may be rejected at 216 and feedback may be provided to the teleoperation manager 202 describing why the request was rejected. In some examples, the computing device 214 may verify the validity of the request and the one or more other conditions and, in response to determining that one or more of the conditions is not satisfied, may determine if the computing device 214 can take an action to satisfy the condition, such as changing a state or altering a current mode of the computing device before acting on the request. When the logic 212 passes the request then the computing device 214 may engage autonomy 218 and/or disengage autonomy 220 in accordance with the request.

Figure 3:
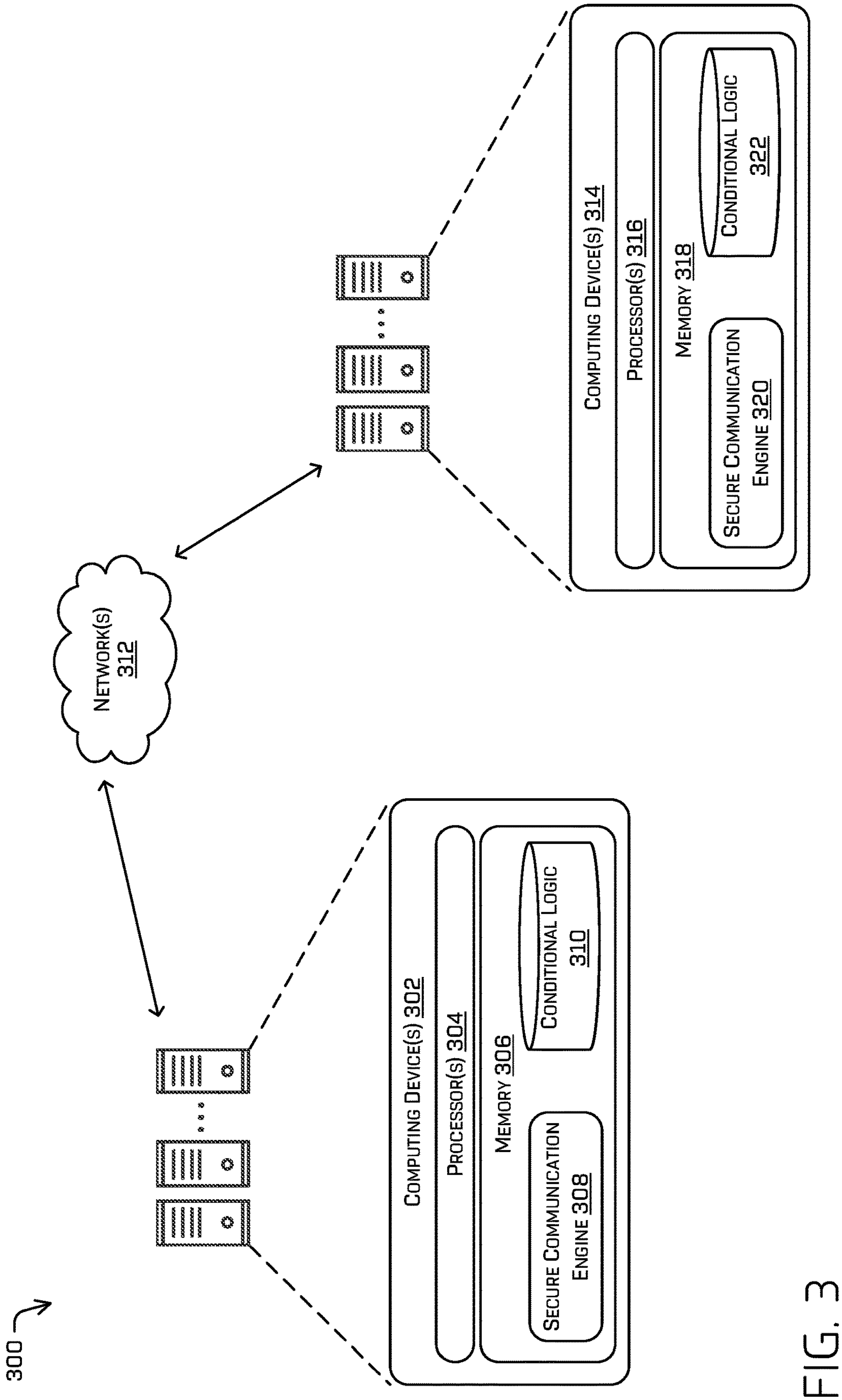
FIG. 3 illustrates a block diagram of separate computing devices to enable control of a second computing device by a first computing device, according to at least one example.

FIG. 3 illustrates a block diagram 300 of separate computing devices to enable control of a second computing device 314 by a first computing device 302, according to at least one example. As described herein, the techniques provided may be implemented in systems where multiple computing devices communicate over a network 312 and provide instructions, remotely control, or otherwise influence the performance or actions carried out by another computing device.

In the block diagram 300, the first computing device 302 includes a processor 304 and a memory 306. The memory may include a secure communication engine 308 and conditional logic 310. The processor 304 may execute instructions stored on the memory 306 to carry out one or more actions, such as described herein.

The secure communication engine 308 may include information related to controlling or requesting control of operation of the second computing device 314. The second computing device 314 may also include a processor 316, memory 318, secure communication engine 320, and conditional logic 322. The secure communication engine 308 and secure communication engine 320 may be used to evaluate requests sent between the first computing device 302 and the second computing device 314. For example, the secure communication engine 308 and secure communication engine 320 may implement the logic 208 and 212 of FIG. 2 and/or the validation components 120 and 122 of FIG. 1. The secure communication engines 308 may enable the first computing device 302 to receive requests from the second computing device 314 and validate such requests and may also enable validation of requests from the first computing device 302 sent over the network 312 to the second computing device 314.

The conditional logic 310 and conditional logic 322 may include the conditions used to evaluate requests sent between the computing devices. In some examples, the conditional logic 310 may include different conditions than the conditional logic 322 related to the abilities, modes, states, abilities, or other differences between the first computing device 302 and the second computing device 314.

In some examples, the conditional logic 310 and/or the conditional logic 322 may each, or individually, include a first set of conditions and a second set of conditions. The first set of conditions may be used to evaluate requests to be sent from the respective computing device. The second set of conditions may be used to evaluate requests received from a remote computing device. In this manner, the secure communication engine 308 and secure communication engine 320 may each act in accordance with the validation component 120 and validation component 122 and the logic 208 and logic 212.

In the example of the block diagram 300, the first computing device 302 and the second computing device 314 may each be configured to send requests to control or cause the other computing device to perform particular actions. Such actions may only be performed after validation is confirmed at each of the secure communication engines.

Figure 4:
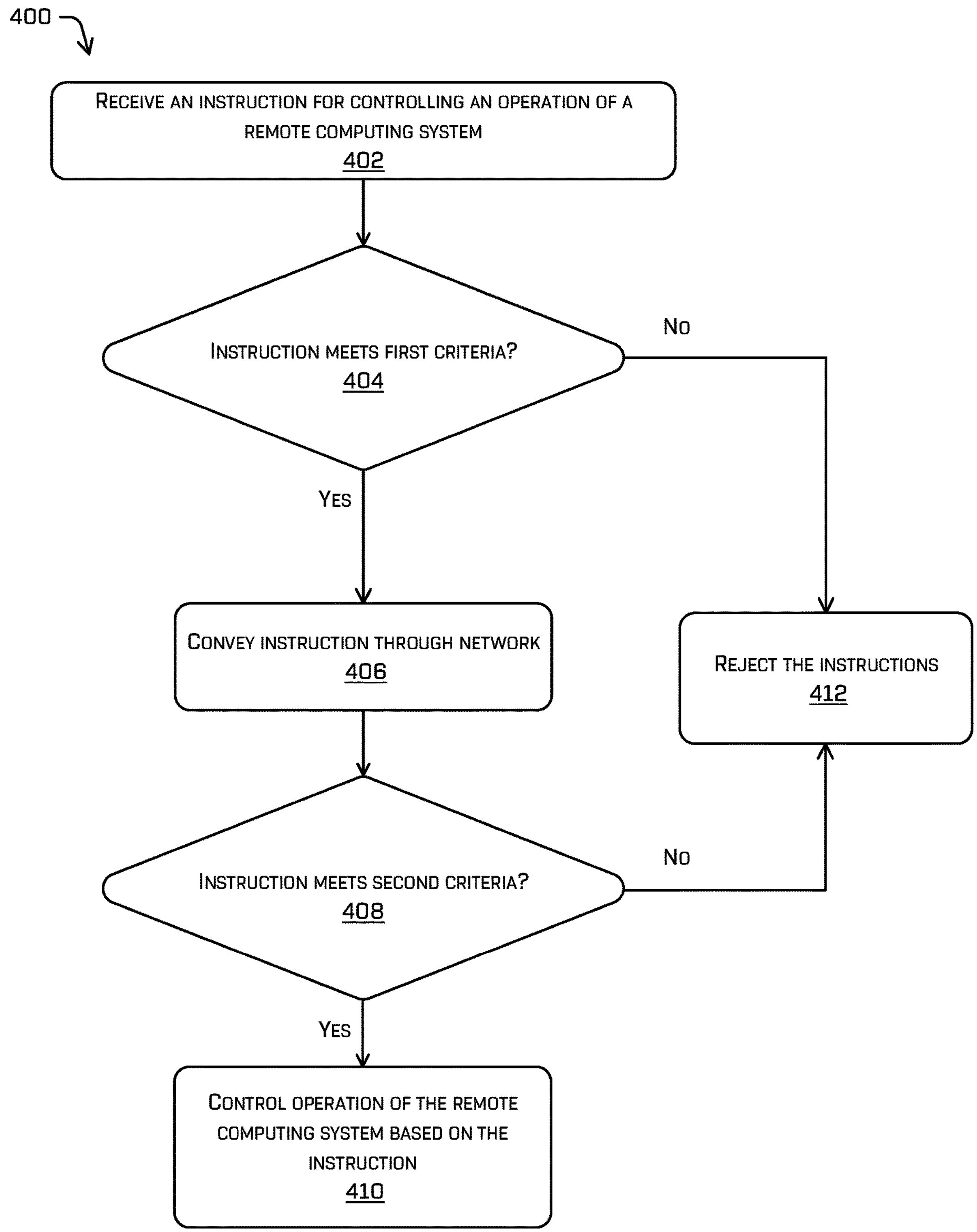
FIG. 4 illustrates an example flow diagram for controlling operation of a second computing device by a first computing device, according to at least one example.
Figure 5:
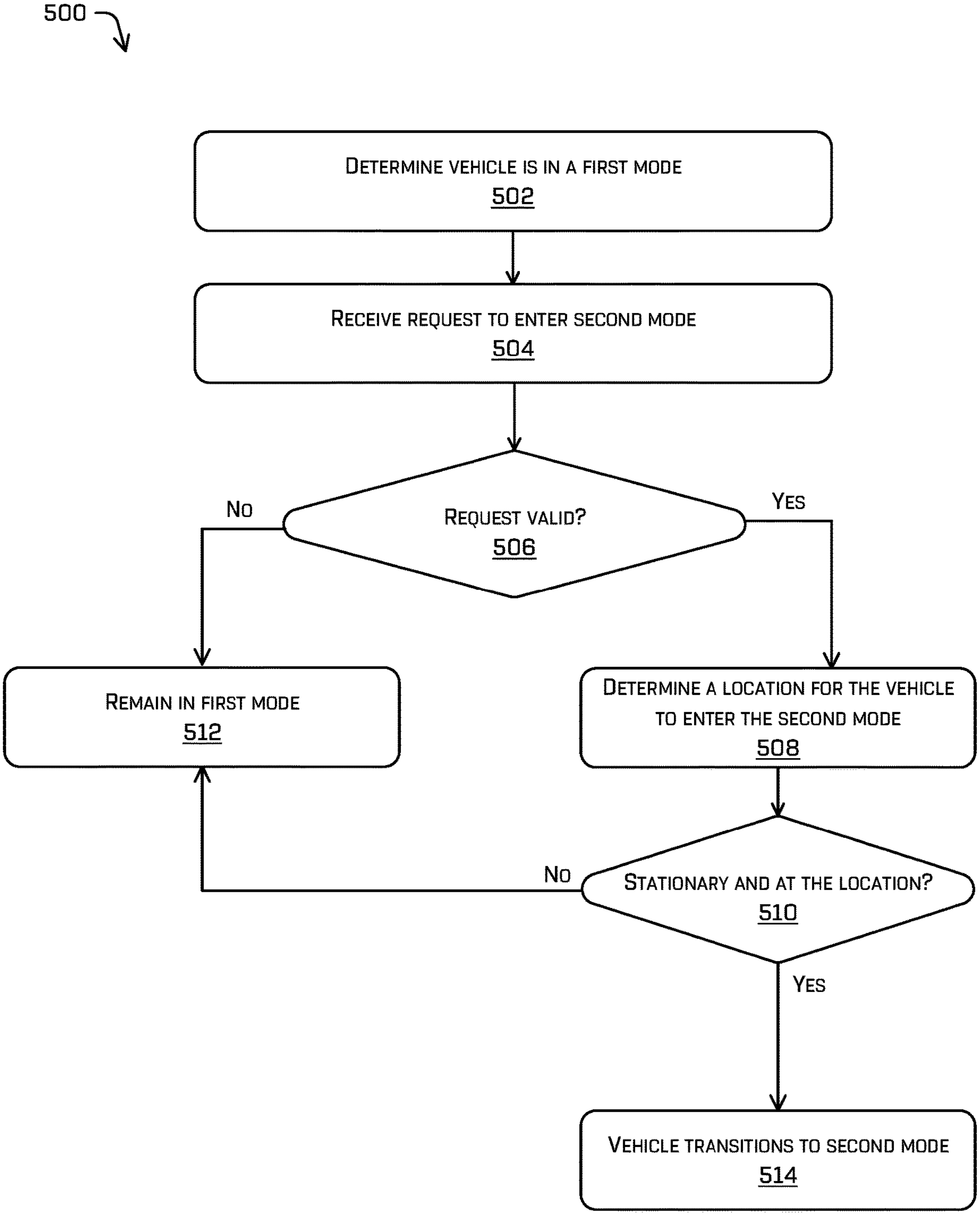
FIG. 5 illustrates an example flow diagram for changing an autonomous driving mode of a vehicle through a remote computing system, according to at least one example.
Figure 6:
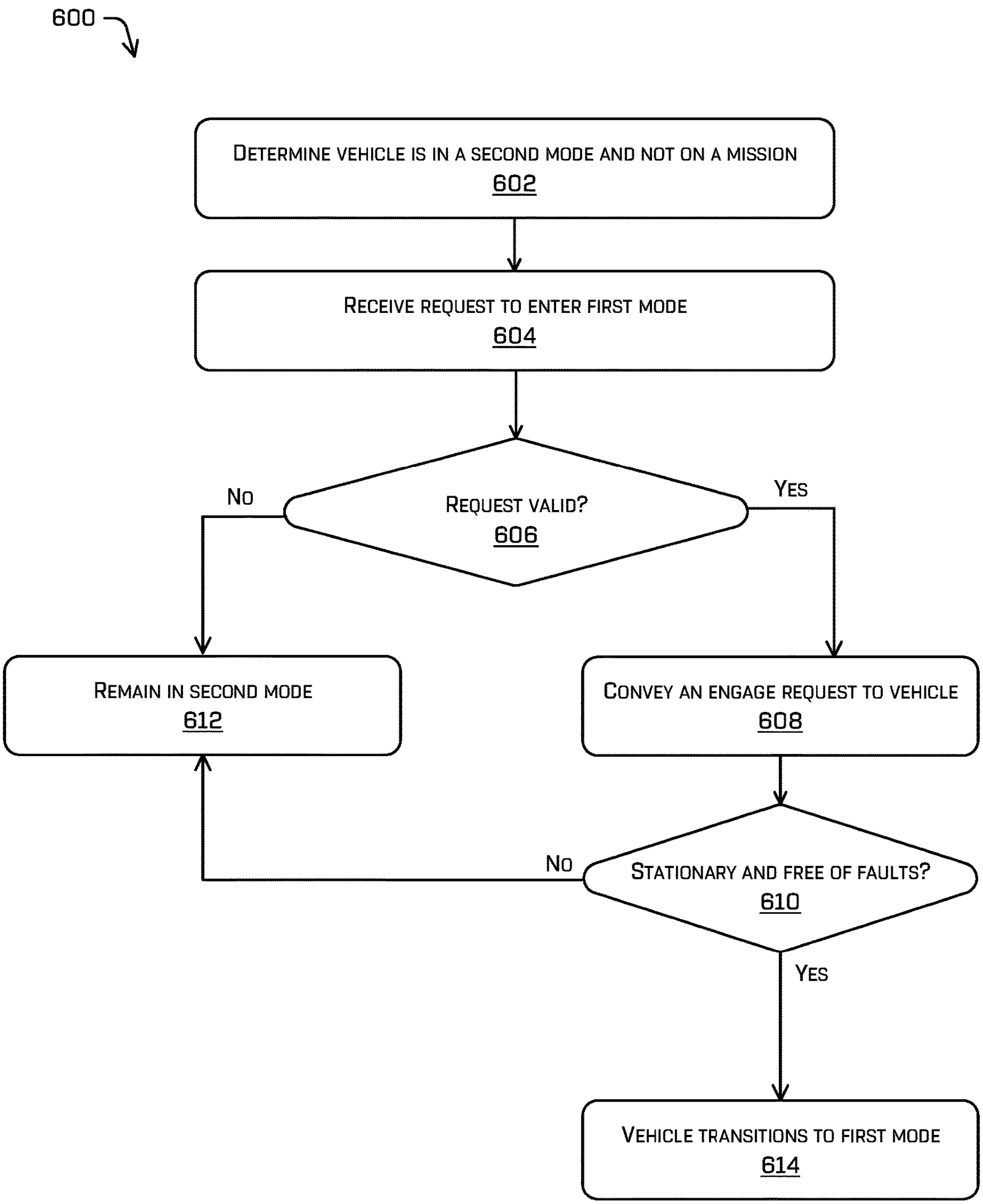
FIG. 6 illustrates an example flow diagram for changing an autonomous driving mode of a vehicle through a remote computing system, according to at least one example.

FIGS. 4-6 illustrates example processes in accordance with examples of the disclosure. The processes are illustrated as a logical flow graph, each operation of which representing a sequence of operations that may be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be omitted and/or combined in any order and/or in parallel to implement the processes.

FIG. 4 illustrates an example flow diagram for a process 400 for controlling operation of a second computing device by a first computing device, according to at least one example. The process 400 may be performed by a computing device, such as a computing device associated with an autonomous vehicle system and/or a remote teleoperation system and may be used to carry out some or all of process 400. The process 400 may additionally be performed by a computing device and/or a remote computing device to control operation of one of the computing device and/or the second computing device. In some examples, the process 400 may be performed to securely enter and exit an autonomous driving mode for a vehicle from a remote computing system.

At 402, the process 400 includes receiving an instruction for controlling an operation of a remote computing system. In some examples, the instruction may be received as part of a request from an autonomous vehicle. For example, a person may request a change in operation of the autonomous vehicle and/or the autonomous vehicle may identify a situation or scene and determine that transitioning to a manual mode or disengaging from autonomous mode may be appropriate. In an illustrative example, emergency services personnel may be encountered by the autonomous vehicle and the personnel may initiate a request to disengage from autonomous mode and/or the autonomous vehicle may request to disengage based on detecting a presence of emergency services vehicles and/or personnel within a threshold distance of the autonomous vehicle.

In some examples, the instruction may be received at a teleoperations system associated with a fleet of autonomous vehicles and may be received as an input from a teleoperator in response to one or more observed or perceived conditions (e.g., in response to observing a request from the autonomous vehicle and/or detecting the presence of emergency services personnel in proximity of the autonomous vehicle). The instruction may be provided to a computing device and may be used to generate a request to be conveyed to the remote computing system to cause the remote computing system to perform an action, such as to engage or disengage a particular mode of operation, such as an autonomous driving mode for an autonomous vehicle.

At 404, the process 400 includes determining if the instruction meets a first set of criteria. The instruction may be evaluated using a component of the computing device, and/or by a separate device in communication with the computing device, such as a gateway or other such device. The instruction may be evaluated to confirm the type of instructions are valid, the format of the instructions are valid, confirms particular identifiers of the remote computing system, confirms the source of the request, and confirms that the instructions are valid to be sent to the remote computing device.

In the event that the instructions do not meet the first set of criteria, the instructions may be rejected at 412. The instructions may be rejected, and a notification may be generated to notify a user of the rejection of the instructions, the notification including the reasons for the rejection of the instructions.

At 406, the process 400 includes conveying the instruction through a network to the remote computing system. The instructions may be conveyed with data representing the evaluation performed at 404, including one or more identifiers, keys, or other such identifiers.

At 408, the process 400 includes determining if the instruction meets a second set of criteria. The instruction may be evaluated using a component of the remote computing device, and/or by a separate device in communication with the remote computing device, such as a gateway or other such device. The instruction may be evaluated based on a second set of conditions, the second set of conditions may include the first set of conditions and may also include other conditions, such as the present state or mode of the remote computing device.

In the event that the instructions do not meet the second set of criteria, the instructions may be rejected at 412. The instructions may be rejected, and a notification may be generated to notify a user of the rejection of the instructions, the notification including the reasons for the rejection of the instructions.

At 410, the process 400 includes controlling operation of the remote computing system based on the instruction.

FIG. 5 illustrates an example flow diagram for changing an autonomous driving mode of a vehicle through a remote computing system, according to at least one example. The process 500 may be performed by a computing device, such as a computing device associated with an autonomous vehicle system and/or a remote teleoperation system and may be used to carry out some or all of process 500. In some examples, the process 500 may be performed to securely enter and exit an autonomous driving mode for a vehicle from a remote computing system.

At 502, the process 500 includes determining that a vehicle is in a first mode. In some examples the first mode may be an autonomous mode. The vehicle may be in autonomous mode and awaiting a mission but may need to be taken out of service for one or more reasons using a manual mode.

At 504, the process 500 includes receiving a request to enter a second mode. The second mode may be a manual mode. The request may be received at a remote computing system, such as a teleoperation system. The teleoperation system may then determine a validity of the request at 506.

At 506, the process 500 includes determining if the request is valid according to a first set of criteria. The request may be evaluated using a component of the teleoperations system and/or by a separate device in communication with the teleoperations system, such as a gateway or other such device. The request may be evaluated to confirm the type of instructions are valid, the format of the instructions are valid, confirms particular identifiers of the remote computing system, confirms the source of the request, and confirms that the request is valid to be sent to the vehicle computing device. In the event that the request is determined to invalid, then at 512, the process 500 rejects the request and the vehicle remains in the first mode.

At 508, the request is sent to the vehicle and the vehicle may determine, either using onboard computing systems and/or based on guidance from the teleoperations system, a location for the vehicle to transition to enter the second mode. The location may be determined based on the location being associated with a parking location, drop off location, pickup location, standby location, or other such location.

At 510, the process 500 includes determining if the vehicle meets certain conditions before transitioning to a second mode (e.g., disengaging from an autonomous mode). In some examples, the conditions may include safety conditions, such as whether the vehicle is in a location, operational mode, environment, that is safe to disengage from autonomous mode. In some examples, the conditions may include contextual conditions such as whether it would make sense to disengage from autonomy, for instance with a vehicle operating on a road without a shoulder or in a tunnel the context may indicate that it is not an appropriate location or time to disengage from autonomy. In some examples, the conditions may include determining if the vehicle is stationary and located at the determined location. In the event that the vehicle is still traveling to the location, the evaluation may be performed iteratively and/or may time out after a predetermined period of time. In some examples, if the vehicle is determined to be stationary but outside of a threshold distance from the location, or is in motion but not traveling to the location, the request may be rejected and the process 500 proceeds to 512 to reject the request and remain in the first mode.

At 514, the process 514 includes transitioning the vehicle to the second mode in response to determining that the request is valid at 510.

In some examples, though described above with the first mode being an autonomous mode and the second mode being a manual mode, as described below with respect to FIG. 6, the system may also be used to engaging an autonomous mode for the vehicle.

FIG. 6 illustrates an example flow diagram for changing an autonomous driving mode of a vehicle through a remote computing system, according to at least one example. The process 600 may be performed by a computing device, such as a computing device associated with an autonomous vehicle system and/or a remote teleoperation system and may be used to carry out some or all of process 600. In some examples, the process 600 may be performed to securely enter and exit an autonomous driving mode for a vehicle from a remote computing system.

At 602, the process 600 includes determining that a vehicle is in a second mode and not currently on a mission. In some examples the second mode may be a manual mode separate from an autonomous operation mode and not currently be executing a mission. As part of determining that the vehicle is not currently on a mission, the process 600 may include confirming that the vehicle is stationary at the first time. The process 600 may include an assumption that the vehicle is not in a designated location, such as a parking location.

At 604, the process 600 includes receiving a request to enter a first mode. The first mode may be an autonomous mode. The request may be received at a remote computing system, such as a teleoperation system.

At 606, the process 600 includes determining if the request is valid according to a first set of criteria. The request may be evaluated using a component of the teleoperations system and/or by a separate device in communication with the teleoperations system, such as a gateway or other such device. The request may be evaluated to confirm the type of instructions are valid, the format of the instructions are valid, confirms particular identifiers of the remote computing system, confirms the source of the request, and confirms that the request is valid to be sent to the vehicle computing device. In the event that the request is determined to invalid, then at 612, the process 600 rejects the request and the vehicle remains in the first mode.

In some examples, the request may be in response to a mission that the vehicle may perform in autonomous mode, therefore in order for the vehicle to perform the mission, the vehicle may need to transition to autonomous mode before performing the mission. Accordingly, the request to engage may be part of a mission that is conveyed to the vehicle thereby causing the vehicle to enter autonomous mode and perform the mission in the autonomous mode.

At 608, the process 600 includes conveying an engage request to the vehicle from the teleoperations system.

At 610, the process 600 includes determining if the vehicle conditions are met. The vehicle conditions may include conditions describing the context, location, operational mode, surrounding environment, and other such information, such as described with respect to step 510. In some examples, the process 600 may include determining if the vehicle is stationary and free of faults that would preclude the vehicle from entering autonomous mode for one or more reasons. In the event that such conditions exist, the request may be rejected at 612 with the vehicle remaining in manual mode, and rejecting the associated mission.

In the event that the vehicle is stationary and free of faults, at 614, the process 614 includes transitioning the vehicle to the first mode in response to determining that the request is valid at 610, and subsequently performing the mission conveyed to the vehicle.

Figure 7:
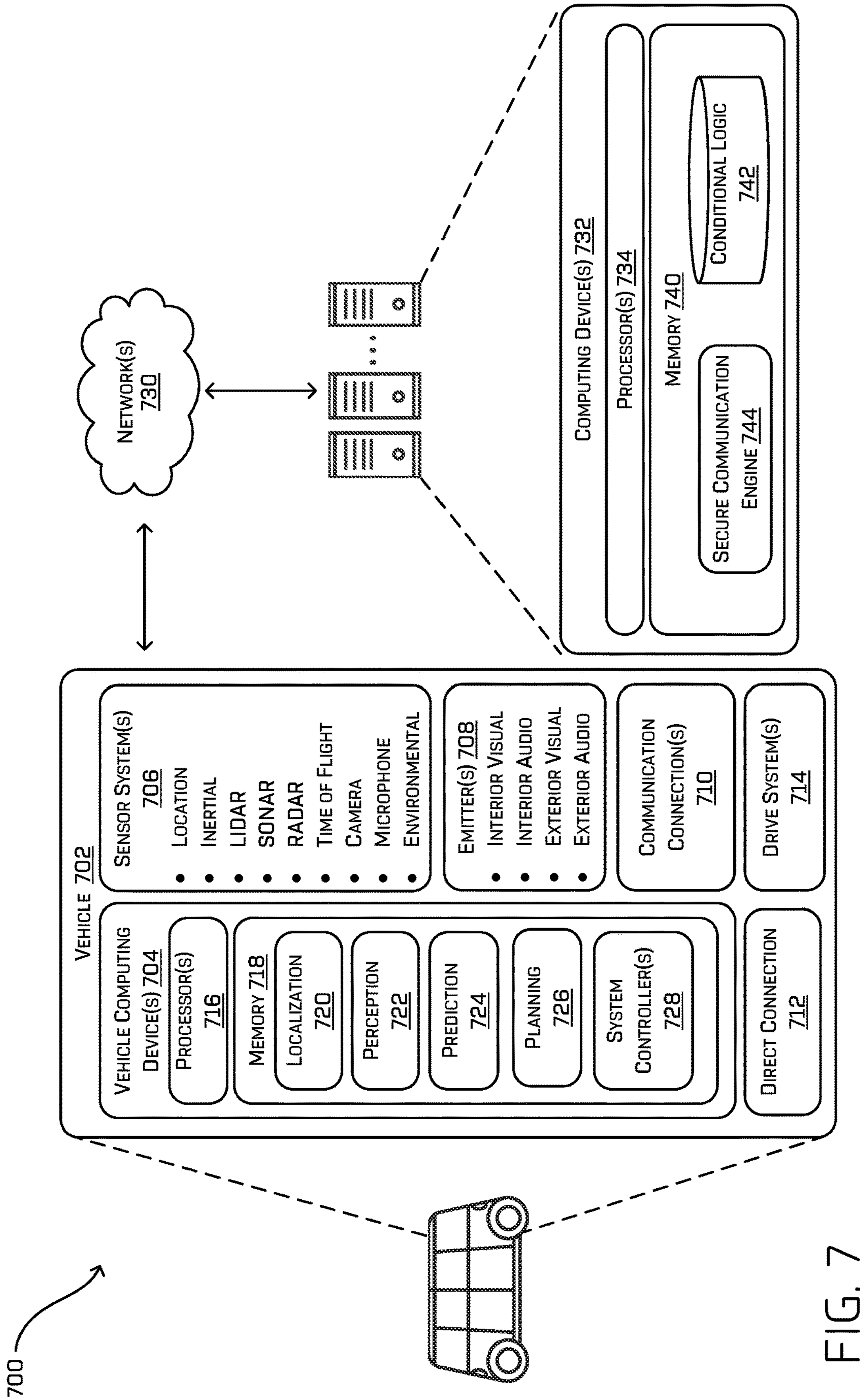
FIG. 7 illustrates an example block diagram of a system including elements that may enable changing an autonomous driving mode, according to at least one example.

FIG. 7 is a block diagram illustrating an example system 700 for processing requests to engage and disengage from an autonomous mode. In at least one example, a vehicle 702 can include one or more vehicle computing device(s) 704, one or more sensor system(s) 706, one or more emitter(s) 708, one or more communication connection(s) 710, at least a direct connection 712, and one or more drive system(s) 714. For the purpose of illustration, the vehicle 702 can be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. In such an example, since the vehicle 702 can be configured to control all functions from start to stop, including all parking functions, it can be unoccupied. This is merely an example, and the systems and methods described herein can be incorporated into any ground-borne, airborne, or waterborne vehicle, including those ranging from vehicles that need to be manually controlled by a driver at all times, to those that are partially or fully autonomously controlled. That is, in the illustrated example, the vehicle 702 is an autonomous vehicle; however, the vehicle 702 could be any other type of vehicle.

In at least one example, the vehicle 702 can be a data collection device. In an additional or alternative example, the one or more components of the AI stack described above can be associated with the vehicle 702. That is, the simulated environment described herein can be used to train, test, and/or validate one or more of the components described below with reference to vehicle 702.

The vehicle computing device(s) 704 can include processor(s) 716 and memory 718 communicatively coupled with the processor(s) 716. In the illustrated example, the memory 718 of the vehicle computing device(s) 704 stores a localization system 720, a perception system 722, a prediction system 724, a planning system 726, one or more system controller(s) 728, and conditional logic 746. Additionally, the memory 718 can include a storage (not shown), which can store map(s), model(s), etc. A map can be any number of data structures modeled in two dimensions, three dimensions, or N dimensions that are capable of providing information about an environment, such as, but not limited to, topologies (such as intersections), streets, mountain ranges, roads, terrain, and the environment in general. Maps can be associated with real environments or simulated environments. Model(s) can include machine-trained models, as described below.

In at least one example, the localization system 720 can determine a pose (e.g., a position and an orientation) of the vehicle 702 in relation to a local and/or global map based at least in part on sensor data received from the sensor system(s) 706 and/or map data associated with a map (e.g., of the map(s)). In at least one example, the localization system 720 can include, or be associated with a calibration system that is capable of performing operations for calibrating (determining various intrinsic and extrinsic parameters associated with any one or more of the sensor system(s) 706), localizing, and mapping substantially simultaneously. Additional details associated with such a system are described in U.S. patent application Ser. No. 15/675,487, filed on Aug. 11, 2017, which is related to U.S. patent application Ser. No. 15/674,853, filed on Aug. 11, 2017, the entire contents of both of which are incorporated by reference herein. As described above, the localization system 720 can output road network data and/or a road mesh based on the sensor data received by the sensor system(s) 706.

In at least one example, the perception system 722 can perform object detection, segmentation, and/or classification based at least in part on sensor data received from the sensor system(s) 706. In at least one example, the perception system 722 can receive raw sensor data (e.g., from the sensor system(s) 706). In other examples, the perception system 722 can receive processed sensor data (e.g., from the sensor system(s) 706). For instance, in at least one example, the perception system 722 can receive data from a vision system that receives and processes camera data (e.g., images). In at least one example, the vision system can utilize one or more image processing algorithms to perform object detection, segmentation, and/or classification with respect to object(s) identified in an image. In some examples, the vision system can associate a bounding box (or other semantic information, such as an instance segmentation) with an identified object and can associate a confidence score associated with a classification of the identified object. In some examples, objects, when rendered via a display, can be colored based on their perceived class. In at least other examples, similar processes (detection, classification, segmentation, etc.) may be performed by the perception system 722 for one or more other modalities (e.g., lidar, RADAR, ToF sensors, etc.).

The prediction system 724 can access sensor data from the sensor system(s) 706, map data associated with a map (e.g., of the map(s) which can be in the storage), and/or perception data output from the perception system 722 (e.g., processed sensor data), and can output predictions associated with one or more objects within the environment of the vehicle 702. In at least one example, the planning system 726 can determine routes and/or trajectories to use to control the vehicle 702 based at least in part on sensor data received from the sensor system(s) 706 and/or any determinations made by the perception system 722. Additional details of localizer systems, perception systems, prediction systems, and/or planning systems that are usable can be found in U.S. Pat. No. 9,612,123, issued on Apr. 4, 2017, and U.S. patent application Ser. No. 15/632,208, filed Jun. 23, 2017, the entire contents of both of which are incorporated by reference herein. In some examples (e.g., where the vehicle 702 is not an autonomous vehicle), one or more of the aforementioned systems and/or components can be omitted from the vehicle 702. While the systems described above are illustrated as "onboard" the vehicle 702, in other implementations, the systems can be remotely located and/or accessible to the vehicle 702.

In at least one example, the localization system 720, the perception system 722, the prediction system 724, and/or the planning system 726 can process sensor data, as described above, and can send their respective outputs over network(s) 730, to computing device(s) 732. In at least one example, the localization system 720, the perception system 722, the prediction system 724, and/or the planning system 726 can send their respective outputs to the computing device(s) 732 at a particular frequency, after a lapse of a predetermined period of time, in near real-time, etc.

In at least one example, the vehicle computing device(s) 704 can include one or more system controller(s) 728, which can be configured to control steering, propulsion, braking, safety, emitters, communication, and other systems of the vehicle 702. These system controller(s) 728 can communicate with and/or control corresponding systems of the drive system(s) 714 and/or other components of the vehicle 702.

The conditional logic 746 may include conditions and/or other information that is used to evaluate and validate the state of the vehicle and/or requests sent between the computing device(s) 732 and the vehicle 702.

In at least one example, the sensor system(s) 706, can include lidar sensors, radar sensors, ToF sensors, ultrasonic transducers, SONAR sensors, location sensors (e.g., GPS, compass, etc.), inertial sensors (e.g., inertial measurement units, accelerometers, magnetometers, gyroscopes, etc.), cameras (e.g., RGB, IR, intensity, depth, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the lidar sensors can include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. In some examples, the sensor system(s) 706 can preprocess at least some of the sensor data prior to sending the sensor data to the vehicle computing device(s) 704. In at least one example, the sensor system(s) 706 can send sensor data, via the network(s) 730, to the computing device(s) 732 at a particular frequency, after a lapse of a predetermined period of time, in near real-time, etc.

The vehicle 702 can also include one or more emitter(s) 708 for emitting light and/or sound, as described above. The emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include light emitters (e.g., indicator lights, signs, light arrays, etc.) to visually communicate with pedestrians, other drivers, other nearby vehicles, etc., one or more audio emitters (e.g., speakers, speaker arrays, horns, etc.) to audibly communicate with pedestrians, other drivers, other nearby vehicles, etc., etc. In at least one example, the emitter(s) 708 can be disposed at various locations about the exterior and/or interior of the vehicle 702.

The vehicle 702 can also include communication connection(s) 710 that enable communication between the vehicle 702 and other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communications connection(s) 710 also enable the vehicle 702 to communicate with a remote teleoperations computing device or other remote services.

The communications connection(s) 710 can include physical and/or logical interfaces for connecting the vehicle computing device(s) 704 to another computing device or a network, such as network(s) 730. For example, the communications connection(s) 710 can enable Wi-Fi-based communication such as via frequencies defined by the IEEE 802.11 standards, short range wireless frequencies such as BLUETOOTH®, or any suitable wired or wireless communications protocol that enables the respective computing device to interface with the other computing device(s).

The direct connection 712 can directly connect the drive system(s) 714 and other components of the vehicle 702.

In at least one example, the vehicle 702 can include drive system(s) 714. In some examples, the vehicle 702 can have a single drive system. In at least one example, if the vehicle 702 has multiple drive system(s) 714, drive system(s) 714 can be positioned on opposite ends of the vehicle 702 (e.g., the front and the rear, etc.). In at least one example, the drive system(s) 714 can include sensor system(s) to detect conditions of the drive system(s) 714 and/or the surroundings of the vehicle 702. By way of example and not limitation, the sensor system(s) can include wheel encoder(s) (e.g., rotary encoders) to sense rotation of the wheels of the drive module, inertial sensors (e.g., inertial measurement units, accelerometers, gyroscopes, magnetometers, etc.) to measure position and acceleration of the drive module, cameras or other image sensors, ultrasonic sensors to acoustically detect objects in the surroundings of the drive module, lidar sensors, radar sensors, etc. Some sensors, such as the wheel encoder(s), can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle 702, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive module controller which can receive and preprocess data from the sensor system(s) and to control operation of the various vehicle systems. In some examples, the drive module controller can include processor(s) and memory communicatively coupled with the processor(s). The memory can store one or more modules to perform various functionalities of the drive system(s) 714. Furthermore, the drive system(s) 714 also include communication connection(s) that enable communication by the respective drive module with other local or remote computing device(s).

In some examples, the vehicle computing device(s) 704, sensor system(s) 706, emitter(s) 708, and the communication connection(s) 710 can be implemented outside of an actual vehicle, for instance, as a simulated vehicle or as simulated systems, for use in "traversing" a simulated environment. That is, the vehicle computing device(s) 704, sensor system(s) 706, emitter(s) 708, and the communication connection(s) 710 can be used as a simulated autonomous vehicle for simulation purposes as described above.

As described above, the vehicle 702 can send sensor data to the computing device(s) 732, via the network(s) 730. In some examples, the vehicle 702 can send raw sensor data to the computing device(s) 732. In other examples, the vehicle 702 can send processed sensor data and/or representations of sensor data to the computing device(s) 732 (e.g., data output from the localization system 720, the perception system 722, the prediction system 724, and/or the planning system 726). In some examples, the vehicle 702 can send sensor data to the computing device(s) 732 at a particular frequency, after a lapse of a predetermined period of time, in near real-time, etc.

The computing device(s) 732 can receive the sensor data (raw or processed) from the vehicle 702 and/or one or more data collection devices (which can include other vehicles like vehicle 702), as well as data from one or more third-party sources and/or systems. In at least one example, the computing device(s) 732 can include processor(s) 734 and memory 740 communicatively coupled with the processor(s) 734. In the illustrated example, the memory 740 of the computing device(s) 732 stores a secure communication engine 744 and conditional logic 742 that may be used to evaluate and validate requests sent between the computing device(s) 732 and the vehicle 702.

As described above, simulated environments can be useful for enhancing training, testing, and/or validating systems (e.g., one or more components of an AI stack) onboard an autonomous vehicle, such as vehicle 702. In at least one example, simulated environments can be useful for training data models where training data from real environments is insufficient (e.g., as is the case with rare objects, rare scenarios, etc.). In such examples, a resulting data model can be provisioned to, or accessible by, the vehicle 702, and the vehicle 702 can utilize the data model for classifying objects in real-time (e.g., while driving or otherwise operating in the real environment). That is, the perception system 722 can utilize the data model (trained based on simulated data associated with a simulated environment) onboard in near real-time to classify objects.

Furthermore, simulated environments can be useful for validating and/or updating a localization algorithm used by the localization system 720. For instance, in real environments, GPS sensors experience positional drifts and may, as a result, accumulate error. Accordingly, to validate a localization algorithm that is used for localizing the vehicle 702, the evaluating computing device(s) 732 can use a simulated environment, where the pose of the vehicle 702 is known at various times (including at all times) and evaluate the sensor data associated with a corresponding real environment to validate the localization algorithm (e.g., by relying on simulated poses as position and/or orientation ground truth). In such an example, the sensor system(s) 706 can generate sensor data associated with the simulated environment and the sensor data can be analyzed by the perception system 722. An output of the perception system 722 (e.g., associated with a position in a real environment) can be validated in view of the sensor data associated with the corresponding position in the simulated environment. That is, the sensor data associated with a position in a simulated environment can serve as the ground truth for the corresponding position in the real environment. As an example, lidar data recorded in association with a simulated environment (e.g., where the pose of the vehicle 702 is known) can be compared to lidar data recorded in association with a corresponding position in a real environment and the localization algorithm can be updated as appropriate. Furthermore, simulated environments can be useful for validating radar or other sensors of the sensor system(s) 706. In some examples, simulated environments can offer ground truth data for calibrating sensors (e.g., of the sensor system(s) 706). Other examples include but are not limited to validating rolling shutter in simulation, calibration (e.g., of one or more of intrinsics or extrinsics) of various sensors, and the like. As would be appreciated, the techniques described herein may be used in validation, calibration, training, etc. for various other systems, subsystems, etc.

The processor(s) 716 of the vehicle 702 and the processor(s) 734 of the computing device(s) 732 can be any suitable processor capable of executing instructions to process data and perform operations as described herein. By way of example and not limitation, the processor(s) 716 and 734 can comprise one or more Central Processing Units (CPUs), Graphics Processing Units (GPUs), or any other device or portion of a device that processes electronic data to transform that electronic data into other electronic data that can be stored in registers and/or memory. In some examples, associated circuits (e.g., ASICs, etc.), gate arrays (e.g., FPGAs, etc.), and other hardware devices can also be considered processors in so far as they are configured to implement encoded instructions.

Memory 718 and 740 are examples of non-transitory computer-readable media. Memory 718 and 740 can store an operating system and one or more software applications, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 732 and/or components of the computing device(s) 732 can be associated with the vehicle 702. That is, the vehicle 702 can perform one or more of the functions associated with the computing device(s) 732, and vice versa.

Example Clauses

A: A system comprising: one or more processors; one or more non-transitory computer-readable media storing instructions executable by one or more processors, wherein the instructions, when executed, cause the one or more processors to perform operations comprising: receiving first data from an autonomous vehicle; receiving, as input from a user, a request to transition the autonomous vehicle between a first mode associated with an autonomous mode and a second mode associated with a disengaged autonomous mode of the autonomous vehicle determining, based at least in part on a set of first validity conditions, the request, and the first data, a first validity associated with the request; transmitting, based at least in part on the first validity, the request; and receiving, from the autonomous vehicle, second data indicative of: a successful transition from the first mode to the second mode based at least in part on a set of second validity conditions being fulfilled; or a rejection of the transition based at least in part on the set of second validity conditions not being fulfilled.

B: The teleoperation system of paragraph A, wherein the set of first validity conditions comprise determining whether the first data comprises an authorization to submit the request and whether the request comprises a valid operation for the autonomous vehicle to perform.

C: The teleoperations system of paragraph B, wherein the set of second validity conditions comprise determining whether the vehicle operating status indicates that the autonomous vehicle is on a mission or in standby mode.

D: The teleoperations system of paragraph B, wherein the second set of validity conditions comprise determining whether a vehicle location is within a geographical region and whether a vehicle motion status is stopped.

E: The system of paragraph B, wherein the valid operation comprises engaging autonomous mode in a safe area.

F: A method comprising: receiving first data from an autonomous vehicle; receiving a request to cause the autonomous vehicle to transition between operating in a first mode and operating in a second mode; determining, based at least in part on the first data, the request, and a first set of conditions, a first validity associated with the request; sending the request to the autonomous vehicle based at least in part on the first validity; and receiving an acknowledgement from the autonomous vehicle comprising of one or more of: a second validity associated with the request based on a second set of conditions different from the first set of conditions; or an indication that the autonomous vehicle is performing or will perform the transition.

G: The method of paragraph F, wherein determining the first validity comprises determining a validity score based at least in part on the first data, the method further comprising one or more of: rejecting the request based on the first validity score being less than a threshold validity score, or transmitting a notification to the first computing device based at least in part on the first validity being less than a threshold validity score.

H: The method of paragraph F, further comprising receiving an indication that the second the request was rejected based at least in part on a condition of the second set of conditions being unsatisfied.

I: The method of paragraph F, wherein the first validity is based at least in part on a trust score associated with the first computing device.

J: The method of paragraph F, wherein the first validity is based at least in part on determining an action associated with the request is one of a set of actions comprising engaging an autonomous mode of the autonomous vehicle in a safe area.

K: The method of paragraph F, wherein the second validity is based at least in part on an operating status of the second computing device.

L: The method of paragraph F, wherein the request comprises an additional action for the autonomous vehicle to perform to fulfill the second set of conditions before performing an action.

M: The method of paragraph F, wherein determining a first validity comprises determining whether a format of the request is proper and whether a type of action included in the request comprises a valid type.

N: The method of paragraph F, wherein the second validity is based at least in part on determining a vehicle state of the autonomous vehicle and whether a vehicle location is within a geographic area.

O: One or more non-transitory computer-readable media storing instructions executable by one or more processors, wherein the instructions, when executed, cause one or more processors to perform operations comprising: receiving, at a first computing device, first data; receiving, at the first computing device, a request to cause a second computing device to transition between a first mode and a second mode; determining, based at least in part on the request, the first data, and a first set of conditions, a first validity associated with the request; sending the request to the second computing device based at least in part on the first validity; and receiving, from the second computing device, an acknowledgement indicating that the second computing device: determined a second validity associated with the request based on a second set of conditions different from the first set of conditions; or is performing or will perform the transition.

P: The one or more non-transitory computer-readable media of paragraph O, wherein determining the first validity comprises determining a validity score, the operations further comprising: rejecting the request based on the validity score being less than a threshold score, or transmitting a notification to the first computing device based at least in part on the validity score being less than a threshold score.

Q: The one or more non-transitory computer-readable media of paragraph O, the operations further comprising receiving, at the first computing device, an indication that the second computing device rejected the request based at least in part on a condition of the second set of conditions being unsatisfied.

R: The one or more non-transitory computer-readable media of paragraph O, wherein: second computing device is associated with an autonomous vehicle, the first mode is an autonomous mode, and the second mode is a disengaged autonomous mode.

S: The one or more non-transitory computer-readable media of paragraph O, wherein determining a first validity comprises determining whether a format of the request conforms to a predefined format and a determining whether a type of action included in the request is an allowed action.

T: The one or more non-transitory computer-readable media of paragraph O, wherein the second validity is based at least in part on determining whether a vehicle state is stopped and determining whether a vehicle location is within a valid location.

U: A system comprising: one or more processors; one or more non-transitory computer-readable media storing instructions executable by one or more processors, wherein the instructions, when executed, cause the one or more processors to perform operations comprising: transmitting, to a remote computing device, first data associated with operation of an autonomous vehicle through an environment; receiving a request to cause the autonomous vehicle system to transition between an autonomous mode and a mode other than the autonomous mode, the request comprising first validity data associated with whether a first set of conditions related to the request are met; determining a second validity associated with the request based on a second set of conditions different from the first set of conditions; and based at least in part on the second validity, one or more of: generating a confirmation message to the first computing device based at least in part on the second validity; and causing the autonomous vehicle system to transition to the mode based on the second validity, or sending a message to the remote computing device rejecting the request.

V: The system of paragraph U, wherein a condition of the second set of conditions comprises determining whether the autonomous vehicle is able to safely engage the autonomous mode.

W: The autonomous vehicle system of paragraph U, wherein the second set of conditions comprises determining whether the autonomous vehicle is on a mission or in standby mode.

X: The autonomous vehicle system of paragraph U, wherein the second set of conditions comprise determining whether a vehicle location is within a geographical region and determining whether the autonomous vehicle is moving at or below a threshold speed.

Y: The autonomous vehicle system of paragraph U, wherein causing the autonomous vehicle to transition between the modes comprises: determining a transition zone; causing the autonomous vehicle to navigate to the transition zone; and determining that the autonomous vehicle is positioned within the transition zone, wherein causing the autonomous vehicle to transition between the modes is based at least in part on determining that the autonomous vehicle is positioned within the transition zone.

Z: A method comprising: receiving, from a first computing device, a request to cause a second computing device to perform an action, the request comprising first validity data indicative of the request satisfying a first set of conditions associated with one or more of a user of the first computing device or the request; determining, by the second computing device, a second validity associated with the request based on a second set of conditions, the second set of conditions different from the first set of conditions and associated with one or more of operation of the second computing device or an environment around the second computing device; and based at least in part on the first validity and the second validity, one or more of: causing the second computing device to perform the action, or refraining from causing the second computing device to perform the action.

AA: The method of paragraph Z, further comprising one or more of: rejecting the request based on the second validity, or transmitting a notification indicative of the second validity to the first computing device.

AB: The method of paragraph Z, wherein determining the second validity comprises one or more of: determining whether the request is associated with an authenticated user, determining whether a format of the request comports with a valid format, determining whether the second computing device is able to perform the action, or determining whether a status of the second computing device is one of a set of allowed statuses.

AC: The method of paragraph Z, further comprising conveying an acknowledgement to the first computing device, the acknowledgement comprising indication that the second computing device is performing or will perform the action.

AD: The method of paragraph Z, wherein the second validity is based at least in part on a trust score associated with the first computing device.

AE: The method of paragraph Z, wherein determining the second validity comprises determining a second validity score, and wherein causing the second computing device to perform the action is based at least in part on the second validity score meeting or exceeding a threshold score.

AF: The method of paragraph Z, wherein the request comprises an additional action for the second computing device to perform to fulfill the second set of conditions before performing the action.

AG: The method of paragraph Z, wherein the first computing device is a remote computing device and the second computing device is associated with an autonomous vehicle, and wherein the action comprises transitioning the second computing device between a first mode associated with autonomous operation and a second mode.

AH: The method of paragraph Z, further comprising conveying an acknowledgement to the first computing device indicating that the second computing device is changing or will change a state of the second computing device based on the second validity.

AI: One or more non-transitory computer-readable media storing instructions executable by one or more processors, wherein the instructions, when executed by one or more processors, cause the one or more processors to perform operations comprising: receiving, from a first computing device, a request to cause a second computing device to perform an action, the request comprising first validity data indicative of the request satisfying a first set of conditions associated with one or more of a user of the first computing device or the request; determining, by the second computing device, a second validity associated with the request based on a second set of conditions, the second set of conditions different from the first set of conditions and associated with one or more of operation of the second computing device or an environment around the second computing device; and based at least in part on the first validity and the second validity, one or more of: causing the second computing device to perform the action, or refraining from causing the second computing device to perform the action.

AJ: The one or more non-transitory computer-readable media of paragraph AI, the operations further comprising one or more of: rejecting the request based on the second validity; or transmitting a notification indicative of the second validity to the first computing device.

AK: The one or more non-transitory computer-readable media of paragraph AI, wherein the first computing device is a remote computing device and the second computing device is associated with an autonomous vehicle, and wherein the action comprises transitioning the second computing device between a first mode associated with autonomous operation and a second mode.

AL: The one or more non-transitory computer-readable media of paragraph AI, wherein causing the second computing device to perform the action comprises changing a state of the second computing device based on the second validity and performing the action based at least in part on a second request conveyed from the first computing device.

AM: The one or more non-transitory computer-readable media of paragraph AI, wherein causing the second computing device to perform the action comprises causing the second computing device to perform one or more additional actions to fulfill the second set of conditions before performing the action.

AN: The one or more non-transitory computer-readable media of paragraph AI, wherein the second validity is based at least in part on a state of the second computing device.

While the example clauses described above are described with respect to one particular implementation, it should be understood that, in the context of this document, the content of the example clauses can also be implemented via a method, device, system, computer-readable medium, and/or another implementation. Additionally, any of examples A-AN may be implemented alone or in combination with any other one or more of the examples A-AN.

CONCLUSION

While one or more examples of the techniques described herein have been described, various alterations, additions, permutations, and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A teleoperations system comprising:

one or more processors; and one or more non-transitory computer-readable media storing instructions executable by the one or more processors, wherein the instructions, when executed, cause the one or more processors to perform operations comprising:

receiving first data from an autonomous vehicle;

receiving, as input remote from the autonomous vehicle, a request to transition the autonomous vehicle between a first mode associated with an autonomous mode and a second mode associated with a disengaged autonomous mode of the autonomous vehicle;

determining, based at least in part on a set of first validity conditions, the request, and the first data, a first validity associated with the request, wherein the set of first validity conditions comprising determining whether the first data comprises an authorization to submit the request and determining whether the request comprises a valid operation for the autonomous vehicle to perform;

transmitting, based at least in part on the first validity, the request; and receiving, from the autonomous vehicle, second data indicative of:

a successful transition between the first mode and the second mode based at least in part on a set of second validity conditions being fulfilled, wherein the set of second validity conditions comprises determining whether an operating status of the autonomous vehicle indicates that the autonomous vehicle is on a mission or in a standby mode; or a rejection of the request transition between the first mode and the second mode based at least in part on the set of second validity conditions not being fulfilled.

2. The teleoperations system of claim 1, wherein the set of first validity conditions comprises determining whether the first data comprises an authorization to submit the request and determining whether the request comprises a valid operation for the autonomous vehicle to perform disengaged autonomous mode is a semi-autonomous driving mode and wherein the autonomous vehicle receives input from a remote teleoperations system to perform a portion of driving tasks of the autonomous vehicle.

3. The teleoperations system of claim 2, wherein the set of second first validity conditions comprises determining whether an operating status of the autonomous vehicle indicates that the autonomous vehicle is on a mission or in standby mode a format of the request is proper.

4. The teleoperations system of claim 2, wherein the set of second validity conditions comprises determining whether a vehicle location is within a geographical region and whether a vehicle motion status is stopped.

5. The teleoperations system of claim 2, wherein the valid operation for the autonomous vehicle to perform comprises engaging the autonomous mode in a safe area.

6. A method comprising:

receiving first data from an autonomous vehicle;

receiving, from a computing device remote from the autonomous vehicle, a request to cause the autonomous vehicle to transition between operating in a first mode and operating in a second mode;

determining, based at least in part on the first data, the request, and a first set of conditions, a first validity associated with the request, wherein the first validity associated with the request comprises determining whether the first data comprises an authorization to submit the request and determining whether the request comprises a valid operation for the autonomous vehicle to perform;

sending the request to the autonomous vehicle based at least in part on the first validity associated with the request; and receiving an acknowledgement from the autonomous vehicle comprising of one or more of:

a second validity associated with the request based on a second set of conditions different from the first set of conditions, wherein the second validity associated with the request comprises determining whether an operating status of the autonomous vehicle indicates that the autonomous vehicle is on a mission or in a standby mode; or an indication that the autonomous vehicle is performing or will perform the transition between operating in the first mode and operating in the second mode.

7. The method of claim 6, wherein determining the first validity associated with the request comprises determining a first validity score based at least in part on the first data, the method further comprising one or more of:

rejecting the request based on the first validity score being less than a threshold validity score, or transmitting a notification to the computing device remote from the autonomous vehicle based at least in part on the first validity score being less than the threshold validity score.

8. The method of claim 6, further comprising receiving a different indication that the request was rejected based at least in part on a condition of the second set of conditions being unsatisfied.

9. The method of claim 6, wherein the first validity associated with the request is based at least in part on a trust score associated with the computing device remote from the autonomous vehicle.

10. The method of claim 6, wherein the first validity associated with the request is based at least in part on determining that an action associated with the request is one of a set of actions comprising engaging an autonomous mode of the autonomous vehicle in a safe area.

11. The method teleoperations system of claim 1, wherein the second validity is based at least in part on an operating status of the rejection comprises one or more rejection reasons and is displayed at a user interface of a user device.

12. The method of claim 6, wherein the request comprises an additional action for the autonomous vehicle to perform to fulfill the second set of conditions before performing an action.

13. The method of claim 6, wherein determining the first validity associated with the request further comprises determining whether a format of the request is proper and whether a type of action included in the request comprises a valid type.

14. The method of claim 6, wherein the second validity associated with the request is based at least in part on determining a vehicle state of the autonomous vehicle and whether a vehicle location is within a geographic area.

15. One or more non-transitory computer-readable media storing instructions executable by one or more processors, wherein the instructions, when executed, cause the one or more processors to perform operations comprising:

receiving first data from an autonomous vehicle;

receiving, from a computing device remote from the autonomous vehicle, a request to transition the autonomous vehicle between a first mode associated with an autonomous mode and a second mode associated with a disengaged autonomous mode of the autonomous vehicle;

determining, based at least in part on a set of first validity conditions, the request, and the first data, a first validity associated with the request, wherein the set of first validity conditions comprising determining whether the first data comprises an authorization to submit the request and determining whether the request comprises a valid operation for the autonomous vehicle to perform;

transmitting, based at least in part on the first validity, the request; and receiving, from the autonomous vehicle, second data indicative of:

a successful transition between the first mode and the second mode based at least in part on a set of second validity conditions being fulfilled, wherein the set of second validity conditions comprises determining whether an operating status of the autonomous vehicle indicates that the autonomous vehicle is on a mission or in a standby mode; or a rejection of the request transition between the first mode and the second mode based at least in part on the set of second validity conditions not being fulfilled.

16. The one or more non-transitory computer-readable media of claim 15, wherein the set of first validity conditions comprises determining whether the first data comprises an authorization to submit the request and determining whether the request comprises a valid operation for the autonomous vehicle to perform rejection comprises one or more rejection reasons and is displayed at a user interface of a user device.

17. The one or more non-transitory computer-readable media of claim 16, wherein the set of second first validity conditions comprises determining whether a vehicle operating status indicates that the autonomous vehicle is on a mission or in standby mode format of the request is proper.

18. The one or more non-transitory computer-readable media of claim 15, wherein the set of second validity conditions further comprises determining whether a vehicle location is within a geographical region and whether a vehicle motion status is stopped.

19. The one or more non-transitory computer-readable media of claim 15, wherein the valid operation for the autonomous vehicle to perform comprises engaging the autonomous mode in a safe area.

20. The one or more non-transitory computer-readable media of claim 15, wherein the second mode is a semi-autonomous driving mode and wherein the autonomous vehicle receives input from a remote teleoperations system to perform a portion of driving tasks of the autonomous vehicle.

* * * * *